(12) United States Patent
Ballentine et al.

(10) Patent No.: US 10,944,354 B2
(45) Date of Patent: Mar. 9, 2021

(54) SOLAR TRACKER BEARING APPARATUS

(71) Applicant: OMCO Solar, LLC, Phoenix, AZ (US)

(72) Inventors: Andrew James Ballentine, Tempe, AZ (US); Matt Kesler, Flagstaff, AZ (US); David J. Wilson, Glendale, AZ (US)

(73) Assignee: OMCO Solar, LLC, Phoenix, AZ (US)

( * ) Notice: Subject to any disclaimer, the term of this patent is extended or adjusted under 35 U.S.C. 154(b) by 192 days.

(21) Appl. No.: 16/058,418

(22) Filed: Aug. 8, 2018

(65) Prior Publication Data
US 2020/0052643 A1    Feb. 13, 2020

(51) Int. Cl.
  *H02S 20/32* (2014.01)
  *F16M 11/10* (2006.01)
  *H02S 30/10* (2014.01)

(52) U.S. Cl.
  CPC ............ *H02S 20/32* (2014.12); *F16M 11/10* (2013.01); *H02S 30/10* (2014.12)

(58) Field of Classification Search
  CPC ..... F24S 2030/15; F24S 30/425; H02S 20/32; H02S 30/10; F16M 11/10; F16C 17/022; F16C 13/04; F16C 35/02; Y02E 10/47; F16L 21/005
  See application file for complete search history.

(56) References Cited

U.S. PATENT DOCUMENTS

| | | | | |
|---|---|---|---|---|
| 3,252,192 A | * | 5/1966 | Smith ...................... | F16L 1/10 269/117 |
| 3,713,714 A | * | 1/1973 | Hill ......................... | F16C 17/10 384/294 |
| 3,972,576 A | * | 8/1976 | Hill ......................... | F16C 17/10 384/276 |
| 3,999,389 A | | 12/1976 | Bryce | |
| 4,100,915 A | | 7/1978 | Carlson | |
| 4,205,657 A | | 6/1980 | Kelly | |
| 4,243,018 A | | 1/1981 | Hubbard | |
| 4,696,285 A | | 9/1987 | Zwach | |
| 5,161,828 A | * | 11/1992 | Hynes .................. | E21B 43/013 166/347 |

(Continued)

FOREIGN PATENT DOCUMENTS

WO     WO-2018167643 A1 *  9/2018  ............. H02S 20/32

*Primary Examiner* — Jorge A Pereiro
(74) *Attorney, Agent, or Firm* — Tarolli, Sundheim, Covell & Turomino LLP

(57) ABSTRACT

A solar tracker bearing apparatus mountable to an upright support post for rotatably supporting a torque tube beam of a solar tracker assembly and including: a rotatable bearing assembly supported for rotation about an axis of rotation by a stationary saddle assembly. The rotatable bearing assembly includes a central portion and first and second spaced apart arcuate peripheral portions, the central portion defining a torque tube beam slot, the first arcuate peripheral portion including a first arcuate rim bearing and the second arcuate peripheral portion including a second arcuate rim bearing, and the first and second rim bearings being spaced apart in a direction parallel to the axis of rotation of the rotatable bearing assembly. The stationary saddle assembly includes a first arcuate bearing race slidably supporting the first arcuate rim bearing and a spaced apart second arcuate bearing race slidably support the second arcuate rim bearing.

30 Claims, 12 Drawing Sheets

(56) References Cited

U.S. PATENT DOCUMENTS

| | | | |
|---|---|---|---|
| 6,347,489 B1 * | 2/2002 | Marshall, Jr. | E02D 27/00 248/354.5 |
| 6,775,890 B2 * | 8/2004 | Kolarik | B25B 27/10 285/114 |
| 7,219,934 B2 * | 5/2007 | McMahon | F16L 21/08 285/420 |
| 7,384,076 B2 * | 6/2008 | Bradley | F16L 21/08 285/104 |
| 7,677,242 B2 | 3/2010 | Carcangiu et al. | |
| 8,052,100 B2 | 11/2011 | Zante et al. | |
| 8,161,962 B2 | 4/2012 | Kuo | |
| 8,267,359 B2 | 9/2012 | Zante et al. | |
| 8,763,601 B2 | 7/2014 | Doyle | |
| 8,939,648 B2 | 1/2015 | Schneider et al. | |
| 9,163,760 B2 * | 10/2015 | Lundstrom | F16L 23/024 |
| 9,281,778 B2 | 3/2016 | Corio et al. | |
| 9,466,749 B1 * | 10/2016 | Au | H02S 20/32 |
| 9,554,761 B2 * | 1/2017 | Baumann | F16C 33/36 |
| D793,848 S * | 8/2017 | Charette | D8/354 |
| 9,806,669 B2 | 10/2017 | Michotte De Welle | |
| 9,808,893 B2 * | 11/2017 | McClure | B23K 37/0533 |
| 9,970,686 B2 | 5/2018 | Au | |
| 10,256,768 B2 | 4/2019 | Owen et al. | |
| 2002/0078945 A1 * | 6/2002 | Funger | F24S 30/425 126/606 |
| 2009/0256046 A1 * | 10/2009 | Hausner | F24S 25/70 248/398 |
| 2009/0314280 A1 * | 12/2009 | Banerjee | F24S 30/45 126/606 |
| 2010/0058703 A1 * | 3/2010 | Werner | G02B 7/183 52/645 |
| 2010/0139646 A1 * | 6/2010 | Barsun | H02S 20/30 126/600 |
| 2010/0275975 A1 | 11/2010 | Monschke et al. | |
| 2011/0162692 A1 * | 7/2011 | Giacalone | F24S 23/74 136/248 |
| 2011/0253195 A1 * | 10/2011 | Kim | H02S 20/00 136/246 |
| 2012/0031488 A1 | 2/2012 | Kaufman et al. | |
| 2012/0152308 A1 * | 6/2012 | Miller | F24S 30/455 136/246 |
| 2012/0152312 A1 * | 6/2012 | Miller | F24S 30/455 136/246 |
| 2012/0180845 A1 * | 7/2012 | Cole | H02S 30/10 136/246 |
| 2015/0222218 A1 | 8/2015 | Koyama | |
| 2016/0261225 A1 | 9/2016 | Paponneau | |
| 2017/0051782 A1 * | 2/2017 | Jones | F16C 43/02 |
| 2017/0102168 A1 * | 4/2017 | Childress | F16C 13/04 |
| 2017/0234580 A1 | 8/2017 | Worden | |
| 2019/0226520 A1 * | 7/2019 | Forder | F16C 17/10 |
| 2019/0379323 A1 * | 12/2019 | Au | F24S 30/425 |
| 2020/0032934 A1 * | 1/2020 | Belen | F16L 21/005 |

\* cited by examiner

SOLAR TRACKER BEARING APPARATUS

TECHNICAL FIELD

The present disclosure relates to a solar tracker bearing assembly or apparatus for a solar tracker system including a plurality of photovoltaic modules supported on a frame assembly and, more specifically, to a solar tracker bearing assembly including a rotatable bearing assembly supported for rotation about an axis of rotation by a stationary saddle assembly, the rotatable bearing assembly includes first and second bearing members defining an interior beam slot for receiving a central or torque tube beam of the solar tracker system and first and second spaced apart peripheral rim bearings, and the stationary saddle assembly including first and second saddle members defining first and second spaced apart arcuate bearing races respectively receiving the first and second peripheral rim bearings.

BACKGROUND

Various types of solar tracker systems are known including a horizontal, single axis solar tracker system. A horizontal, single axis solar tracker system includes a frame for supporting a plurality of photovoltaic modules. The frame includes a torque tube beam and an array module rails which support the plurality of photovoltaic modules. The torque tube beam is typically comprised of one or more torque tube beam segments affixed in a linear fashion by collars between adjacent segment ends. The torque tube beam may be comprised of a plurality of segments of predetermined length, i.e., 40 foot segments. The module rails are typically spaced uniformly along the torque tube beam and attached to the torque tube beam via a plurality brackets. The photovoltaic modules, in turn, are secured to the module rails via a plurality of clamps between adjacent pairs of the rails. An extent of the frame extends in two dimensions, length, generally perpendicular to the path or arc of the sun in the sky, and width, generally parallel to the path of sun in the sky. An actuator mechanism, such as a slew drive, is coupled to the torque tube beam to pivot or swing the torque tube beam about an axis of rotation to change an angle of inclination of the frame and thereby adjust the light receiving surfaces of the plurality of photovoltaic modules to track the movement of the sun across the sky so that the photovoltaic modules are maximally exposed to the sun to throughout the day. That is, the goal of the solar tracker system is to move or pivot the frame about an axis of rotation such that the light absorbing surfaces of the photovoltaic modules is generally orthogonal to the position of the sun, within, of course, the limits of the angle of inclination range of the solar tracking system frame.

In one typical embodiment of a single axis, horizontal solar tracker system, the torque tube beam extends horizontally along the length of the frame and, to achieve a proper balance, module rails are orthogonal to and centered about the torque tube beam so that a total weight of the frame and the plurality of photovoltaic modules, and associated clamps and brackets/fasteners, is approximately equally distributed on either side of the torque tube beam. A slew drive is approximately centered along the length of the torque tube beam and includes first and second couplers. A first portion of the torque tube beam is affixed to and extends from the first coupler on one side of the slew drive and a second portion of the torque tube beam is affixed to and extends from the second coupler on the opposite side of the slew drive. For example, the first portion of the torque tube beam may extend north from the slew drive and may be comprised of five 40 foot torque tube beam segments, while, the second portion of the torque tube beam may extend south from the slew drive and may similarly be comprised of five 40 foot torque tube beam segments, thus providing a total north-south extent or length of the torque tube beam of 400 feet. The slew drive pivots a table of the solar tracker system. The table of the solar tracking system is everything that pivots or swings about the axis of rotation and includes: a) the frame including the torque tube and the module rails; b) the photovoltaic modules; and c) the movable portions of a plurality of solar tracking bearing apparatuses that support the torque tube along its length. The axis of rotation of the solar tracker system extends parallel to the torque tube beam.

The torque tube beam is supported for pivoting movement about the axis of rotation by the plurality of solar tracker bearing apparatuses. Each of the solar tracker bearing apparatuses are affixed to a respective one of a plurality of spaced apart upright support posts which are anchored to or anchored in a substrate, such as the ground. The upright support posts are stationary and support the plurality of solar tracker bearing apparatuses, which, in turn, pivotally support the frame and the plurality of photovoltaic modules. Typically, one solar tracker bearing apparatus is mounted or coupled to each upright support post. Each solar tracker bearing apparatus includes a stationary portion, affixed to a support post, and a rotating portion, which rotates about the axis of rotation. Additionally, the slew drive is also mounted to its own support post.

The plurality of solar tracker bearing apparatuses pivotally support the torque tube beam for movement or pivoting about the axis of rotation. The actuator/controller mechanism, i.e., the slew drive, coupled to the torque tube beam provides to motive force to pivot the table about the axis of rotation and thus change the angle of inclination of the table. The plurality of solar tracker bearing apparatuses rotatably disposed between the torque tube beam and the upright support posts permit the torque tube beam to pivot with respect to the upright support posts and thereby allows the angle of inclination of the frame to be changed by the slew drive such that the plurality of photovoltaic module are maximally exposed to the sun within the range of the angle of inclination of the solar tracking system. The axis of rotation of the table of the solar tracker system is defined by a combination of aligned individual axes of rotation of the individual solar tracker bearing apparatuses. The slew drive is positioned such that it pivots the torque tube beam about the axis of rotation.

Solar tracker systems are often erected or installed at remote locations where sun exposure is maximized. As such, the solar tracker bearing apparatuses are utilized in outdoor locations, exposed to varying and potentially harsh weather conditions such as high wind conditions. More over such each solar tracker bearing apparatus receives a portion of a torque tube beam and thus supports a portion of the weight of the solar tracker frame and photovoltaic modules, when the frame and modules are subject to wind loads, snow loads and the like, such forces are transmitted via the torque tube beam through the solar tracker bearing apparatuses to the support posts. Thus, the solar tracker bearing apparatuses are subject to forces, including vector or linear forces of various directions and magnitudes, as well as various torque forces. Accordingly, it is desirable that a solar tracker bearing apparatuses be: a) durable and low maintenance over the useful life of the apparatuses; b) able to withstand linear and torque forces applied to the bearing apparatus; c) provide for stable support of the torque tube beam and the weight of the frame and photovoltaic modules over an extended useful life; d) easy to assemble on site at remote locations by workers with varying skill levels; and e) include mounting adjustment capability along multiple axes to compensate for the fact that the mounting surfaces provided by an individual upright support post may not be in perfect alignment with the torque tube beam to be received and rotatably supported by the solar tracker bearing apparatus. Providing such a solar tracker bearing apparatus is a continuing challenge for designers.

SUMMARY

In one aspect, the present disclosure relates to a solar tracker bearing apparatus mountable to a support post for pivotally supporting a torque tube beam of a solar tracker assembly, the solar tracker bearing apparatus comprising: a rotatable bearing assembly supported for rotation about an axis of rotation by a saddle assembly, the rotatable bearing assembly including a central portion and first and second spaced apart arcuate peripheral portions, the central portion defining a torque tube beam slot, the first arcuate peripheral portion including a first arcuate rim bearing and the second arcuate peripheral portion including a second arcuate rim bearing, the first and second rim bearings being spaced apart in a direction parallel to the axis of rotation of the rotatable bearing assembly; and the saddle assembly including a lower coupling portion and an upper bearing portion, the upper bearing portion including a first arcuate bearing race and a spaced apart second arcuate bearing race, the first and second arcuate bearing races being spaced apart in a direction parallel to the axis of rotation of the rotatable bearing assembly, the first arcuate bearing race slidably supporting the first arcuate rim bearing of the rotatable bearing assembly and the second arcuate bearing race slidably supporting the second arcuate rim bearing of the rotatable bearing assembly, the first arcuate bearing race including an inner bearing race and a radially spaced apart outer bearing race, the inner bearing race providing sliding bearing support for an inner surface of the first rim bearing and the outer bearing race providing sliding bearing support for an outer surface of the first rim bearing and the second arcuate bearing race including an inner bearing race and a radially spaced apart outer bearing race, the inner bearing race providing sliding bearing support for an inner surface of the second rim bearing and the outer bearing race providing sliding bearing support for an outer surface of the second rim bearing.

In another aspect, the present disclosure relates to a solar tracker bearing apparatus mountable to a support post for pivotally supporting a torque tube beam of a solar tracker assembly, the solar tracker bearing apparatus comprising: a rotatable bearing assembly supported for rotation about an axis of rotation by a saddle assembly, the rotatable bearing assembly including a torque tube beam slot and a first bearing member and a second bearing member affixed to the first bearing member, the first bearing member including a central region and a laterally extending peripheral rim and the second bearing member including a central region and a laterally extending peripheral rim, the laterally extending peripheral rim of the first bearing member including a first arcuate rim bearing and the laterally extending peripheral rim of the second bearing member including a second arcuate rim bearing, the first and second rim bearings being spaced apart in a direction parallel to the axis of rotation of the rotatable bearing assembly, the central region of the first bearing member including a cut out in an upper portion of the central region and a projection adjacent the cut out extending in a direction parallel to the axis of rotation of the rotatable bearing assembly toward the second bearing member, the central region of the second bearing member including a cut out in an upper portion of the central region and a projection adjacent the cut out and extending in a direction parallel to the axis of rotation of the rotatable bearing assembly toward the first bearing member, facing surfaces of the projections of the first bearing member and the second bearing member abutting to space apart the central regions of the first and second bearing members and the cut out of the first bearing member and the cut out of the second bearing member and the projection of the first bearing member and the projection of the second bearing member being part of the torque tube beam slot of the rotatable bearing assembly; and the saddle assembly including a lower coupling portion and an upper bearing portion, the upper bearing portion including a first arcuate bearing race and a spaced apart second arcuate bearing race, the first and second arcuate bearing races being spaced apart in a direction parallel to the axis of rotation of the rotatable bearing assembly, the first arcuate bearing race slidably supporting the first arcuate rim bearing of the first bearing member of the rotatable bearing assembly and the second arcuate bearing race slidably supporting the second arcuate rim bearing of the second bearing member of the rotatable bearing assembly, the first arcuate bearing race including an inner bearing race and a radially spaced apart outer bearing race, the inner bearing race providing sliding bearing support for an inner surface of the first rim bearing and the outer bearing race providing sliding bearing support for an outer surface of the first rim bearing and the second arcuate bearing race including an inner bearing race and a radially spaced apart outer bearing race, the inner bearing race providing sliding bearing support for an inner surface of the second rim bearing and the outer bearing race providing sliding bearing support for an outer surface of the second rim bearing.

In another aspect, the present disclosure relates to a solar tracker bearing apparatus mountable to a support post for pivotally supporting a torque tube beam of a solar tracker assembly, the solar tracker bearing apparatus comprising: a rotatable bearing assembly supported for rotation about an axis of rotation by a saddle assembly, the rotatable bearing assembly including a central portion and first and second spaced apart arcuate peripheral portions, the central portion defining a torque tube beam slot, the first arcuate peripheral portion including a first arcuate rim bearing and the second arcuate peripheral portion including a second arcuate rim bearing, the first and second rim bearings being spaced apart in a direction parallel to the axis of rotation of the rotatable bearing assembly; and the saddle assembly including a first saddle member and a second saddle member affixed to the first saddle member, the first saddle member including an upper bearing region including the first arcuate bearing race and a lower support region, the lower support region including a projection extending in a direction parallel to the axis of rotation of the rotatable bearing assembly toward the second saddle member and the second saddle member including an upper bearing region including the second arcuate bearing race and a lower support region, the lower support region including a projection extending in a direction parallel to the axis of rotation of the rotatable bearing assembly toward the first saddle member, facing surfaces of the projections of the first saddle member and the second saddle member abutting to space apart the first and second arcuate bearing races, the first arcuate bearing race slidably supporting the first arcuate rim bearing of the rotatable bearing assembly and the second arcuate bearing race slidably supporting the second arcuate rim bearing of the rotatable bearing assembly, the first arcuate bearing race including an inner bearing race and a radially spaced apart outer bearing race, the inner bearing race providing sliding bearing support for an inner surface of the first rim bearing and the outer bearing race providing sliding bearing support for an outer surface of the first rim bearing and the second arcuate bearing race including an inner bearing race and a radially spaced apart outer bearing race, the inner bearing race providing sliding bearing support for an inner surface of the second rim bearing and the outer bearing race providing sliding bearing support for an outer surface of the second rim bearing.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
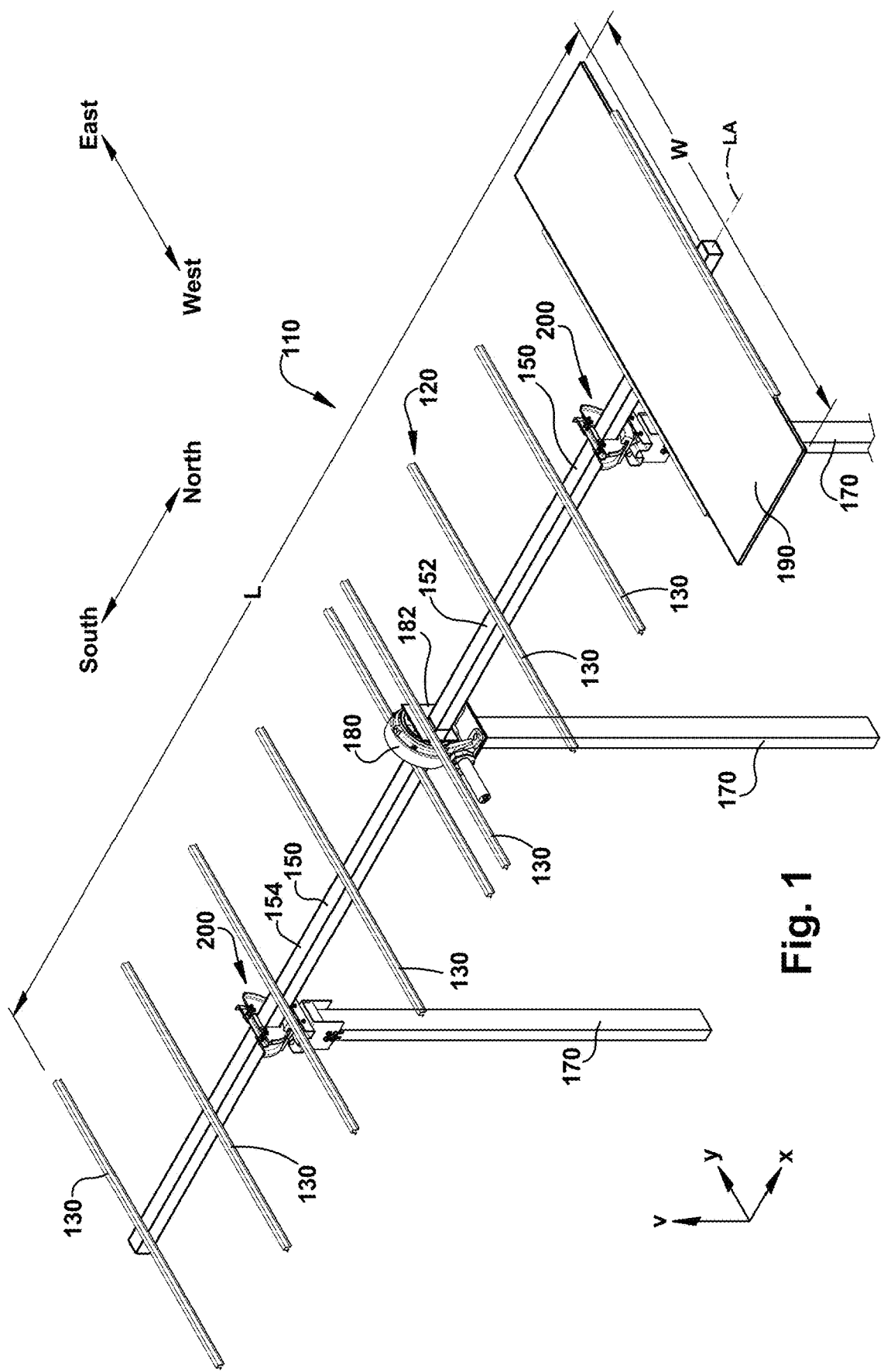
FIG. 1 is a schematic perspective view of a solar tracker assembly including a plurality of solar tracker bearing apparatuses of the present disclosure.

The present disclosure relates to a solar tracker bearing assembly or apparatus 200 for a solar tracker system 100 which permits and constrains a torque tube beam 150 of the system 100 to pivot or swing about an axis of rotation R. A plurality of solar tracker bearing apparatuses 200 are positioned at spaced apart locations along the torque tube beam 150 to pivotally support the torque tube beam 150. Advantageously, each of the plurality of solar tracker bearing apparatuses 200 includes a stationary saddle assembly 400 that rotatably supports and defines the axis of rotation R for a rotatable bearing assembly 300. That is, the rotatable bearing assembly 300 is confined to rotate about the axis of rotation R by the saddle assembly 400. In turn, the rotatable bearing assembly 300 supports the torque tube beam 150 and constrains the torque tube beam 150 to pivot or swing about the axis of rotation R. Thus, the axis of rotation R that the torque tube beam 150 is constrained to swing or pivot about is defined by the solar tracker bearing apparatus 200.

The solar tracker system 100 includes components that move or pivot about the axis of rotation R and other components which are stationary. The components of the solar tracker system 100 that pivot about the axis of rotation R are referred to as the table 110 of the solar tracker system and include: a) a frame 120 including the torque tube beam 150 and an array or plurality of module rails 130 affixed to the torque tube beam 150; b) a plurality of photovoltaic modules 190; c) the rotatable bearing assemblies 300 of the plurality of solar tracking bearing apparatuses 200 that support the torque tube 150 along its length; and d) associated brackets, clamps, fasteners, etc. that affix the photovoltaic modules 190 to the frame 120 and secure the components of the frame 120 together. Stationary components of the solar tracker system 100 include: a) a plurality of upright support posts 170 that support the saddles 400 of the solar tracer bearing apparatuses 200; b) the saddles 400 of the plurality of solar tracking bearing apparatuses 200; and c) an actuator/drive 180 that is coupled to the torque tube beam 150 and provides the motive power for pivoting the torque tube beam 150 and the table 110 though an angle of inclination AI, In one exemplary embodiment, the actuator/drive 180 is a slew motor that bisects the torque tube beam 150 along its length L at approximately a midpoint and is positioned on a support post 170 such that it drives the torque tube beam 150 and the table 110 about the axis of rotation R.

The plurality of solar tracker bearing apparatuses 200 are positioned along the torque tube beam 150 such that the bearing apparatuses 200 are substantially parallel to but spaced from a longitudinal axis LA of the torque tube beam 150. The individual axis of rotation R of each is the plurality of solar tracker bearing apparatuses 200 are thus substantially aligned to or coincident forming a single or combined axis of rotation CR. That is, the axis of rotation R of each of the solar tracker bearing apparatuses 200 are substantially coincident with the combined axis of rotation CR of the plurality of solar tracker bearing apparatuses 200. Hence, hereinafter when reference is made to the axis of rotation R of a given solar tracker bearing apparatus 200 it is to be understood that this axis of rotation R is part of and coincident with the combined axis of rotation CR of the plurality of solar tracker bearing apparatuses 200. Thus, reference will only be made to the axis of rotation R both for a specific solar tracker bearing apparatus 200 or the plurality of solar tracker bearing apparatuses 200.

Figure 8:
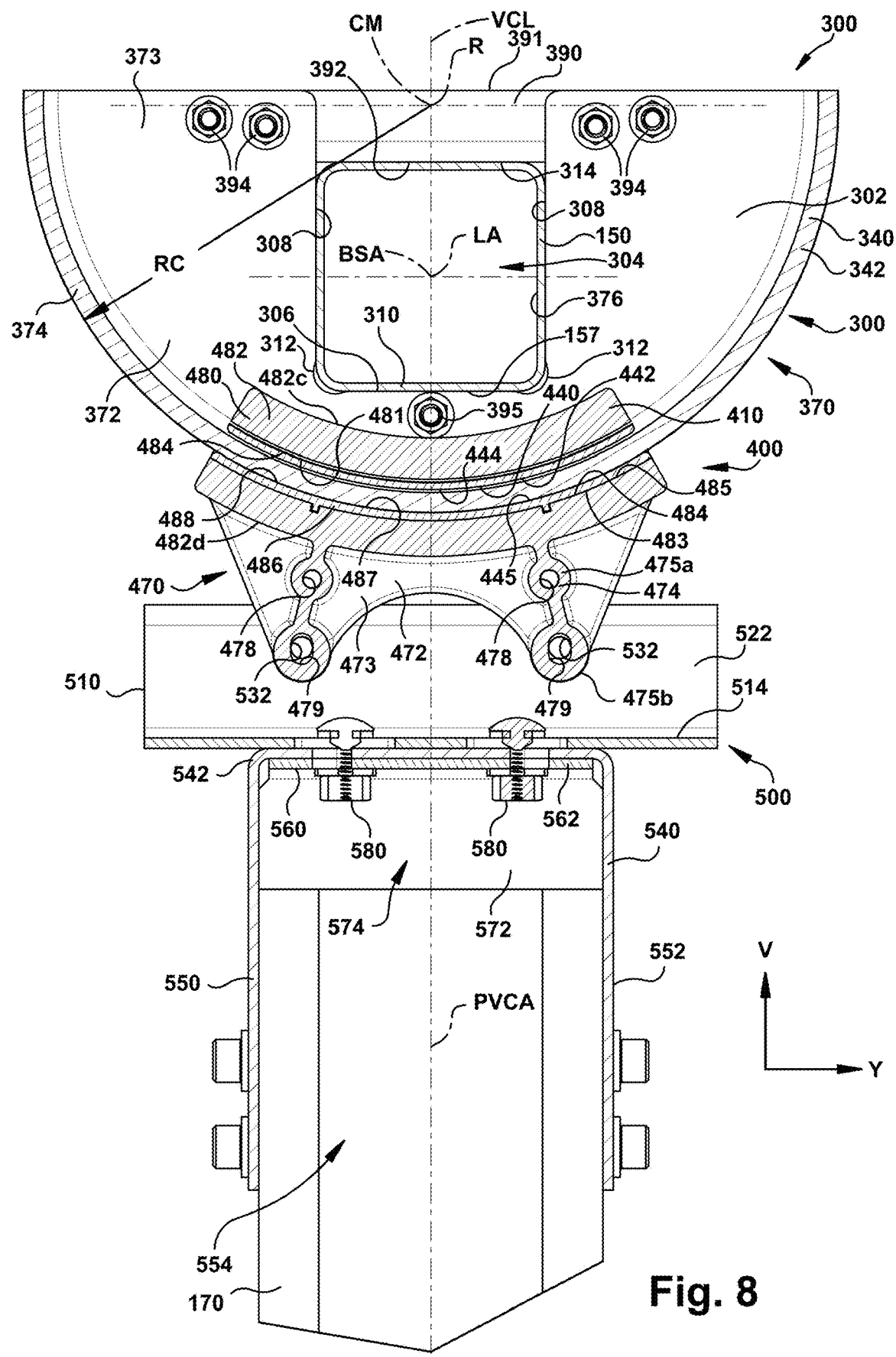
FIG. 8 is a schematic longitudinal section view of the solar tracker bearing apparatus of FIG. 2 as seen from a plane indicated by the line 8-8 in FIG. 3.

Much of the weight of the table 110 is accounted for by the plurality of photovoltaic modules 190 which are supported by the array or plurality of module rails 130 in a position that is generally vertically above the torque tube beam 150. A vertical direction V is shown FIG. 1. As such, a center of mass CM of the table 110 if calculated, will typically be found to be vertically aligned with the longitudinal axis of the torque tube beam 110, but positioned vertically above an upper wall 156 of the torque tube beam 110, that is, outside of and vertically above the torque tube beam 150. Of course, the exact position or location of the center of mass CM of the table 110 will depend on the configuration, and weight of the components comprising the table 110 of the solar tracker system 100. For proper balance and stability of the table 110 under varying load conditions (i.e., wind and snow loads, etc.), it is advantageous if the axis of rotation R of the plurality of solar tracker bearing apparatuses 200 passes through or passes as close as possible to the center of mass CM of the table 110. Since the axis of rotation R is determined by rotating path of travel of the rotatable bearing assemblies 300 of the plurality of solar tracker bearing apparatuses 200, the toque tube beam 150 which is disposed within a beam slot 306 of the rotatable bearing assemblies 300 is constrained to pivot or swing about the axis of rotation R. As best seen in FIG. 8, in one exemplary embodiment, the axis of rotation R is spaced from and outside of the walls of the torque tube beam 150. A periphery of the beam slot 306 is bounded by and defined by an upper wall 314 and axially spaced apart lower or bottom wall 310 wall and first and second laterally spaced apart side walls 308. The upper wall 314 of the beam slot 306 is defined by a lower wall 392 of a hold down bracket 390 of the rotatable bearing assembly 300. Extending through a center of the beam slot 306, as defined by beam slot walls 314, 310, 308 is a longitudinally or horizontally extending central beam slot axis BSA.

Figure 14:
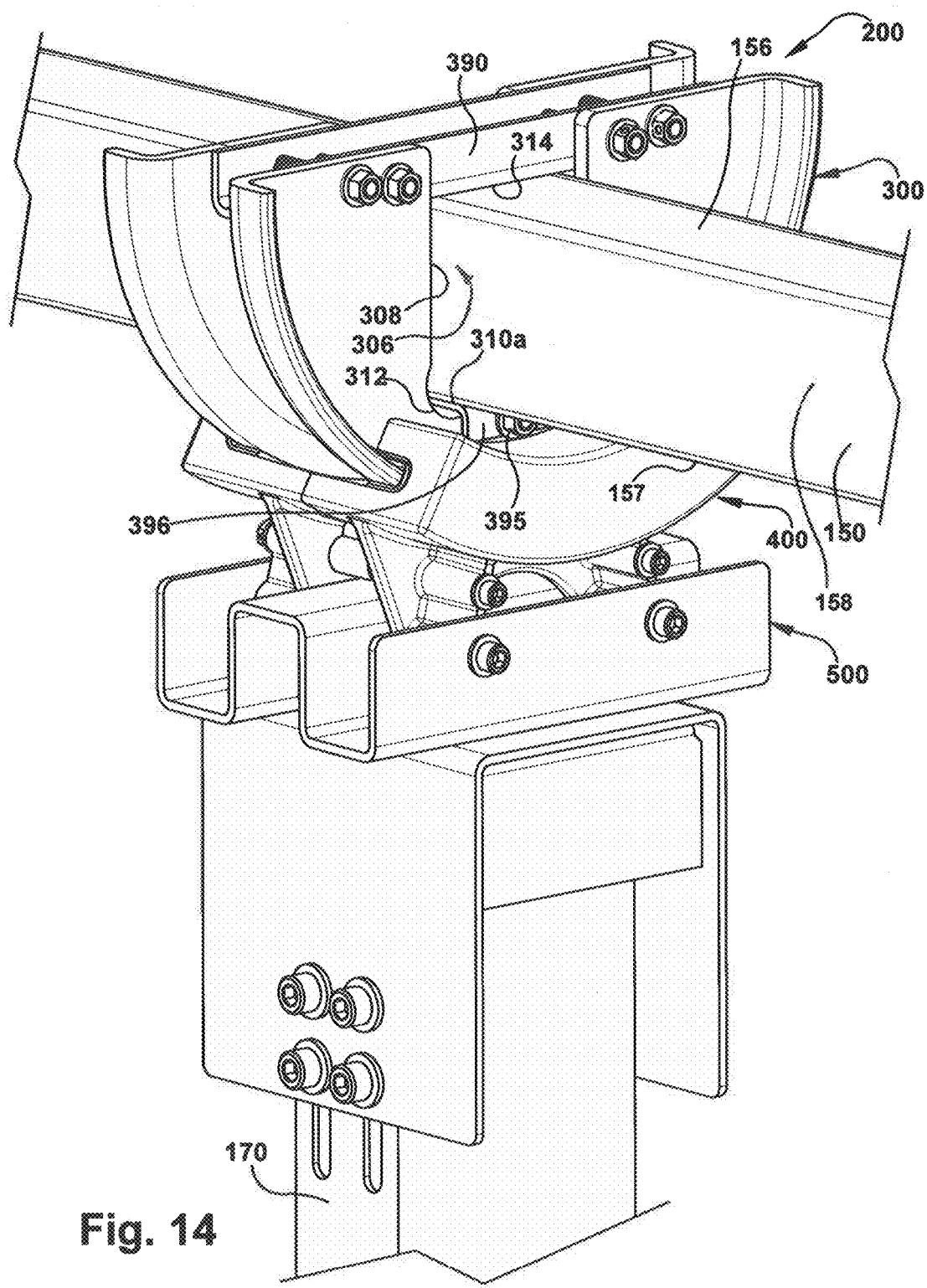
FIG. 14 is a schematic front perspective view of the solar tracker bearing apparatus of FIG. 2 with a shim positioned in a beam slot of the rotatable bearing assembly.
Figure 15:
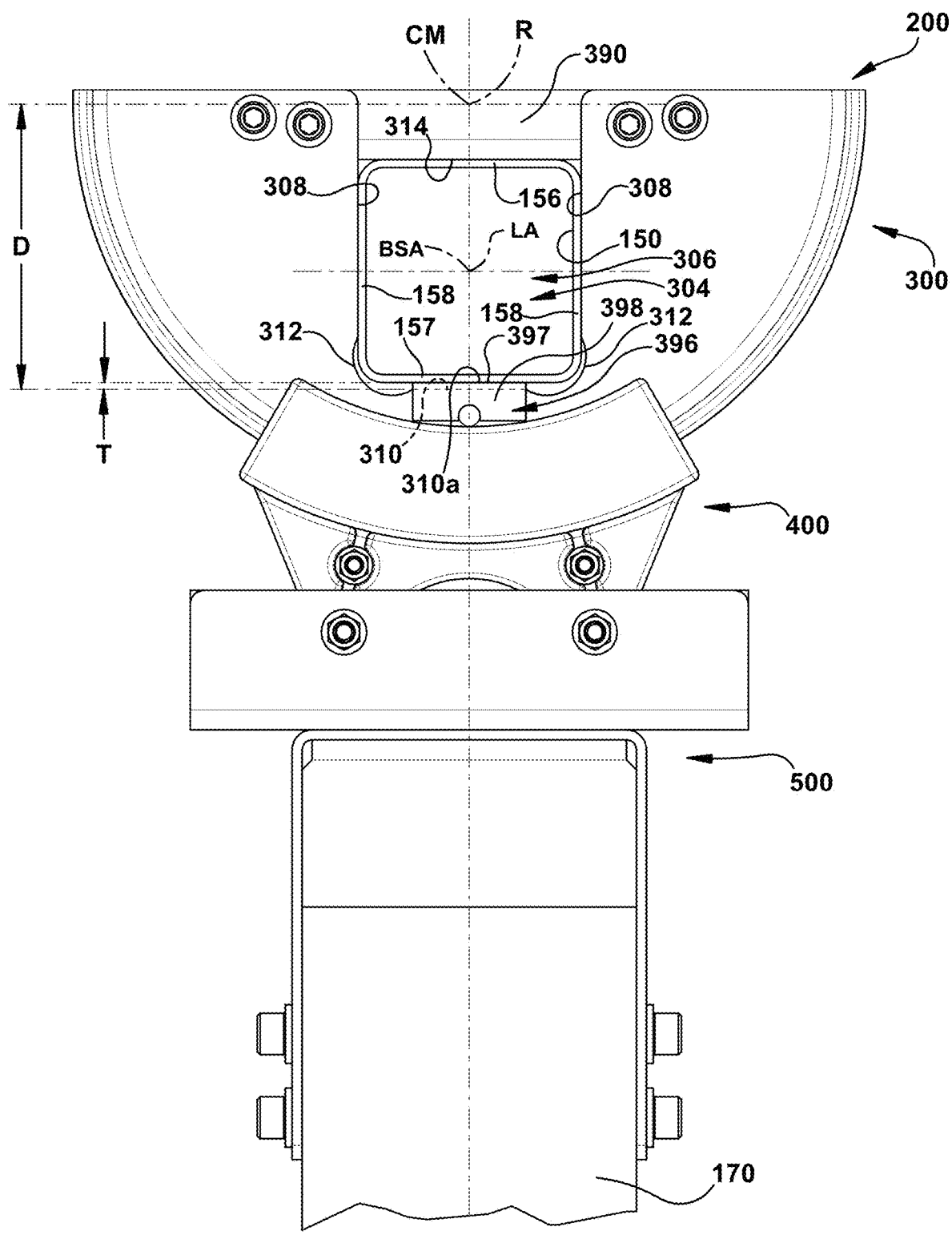
FIG. 15 is a schematic front elevation view of the solar tracker bearing apparatus of FIG. 14.
Figure 16:
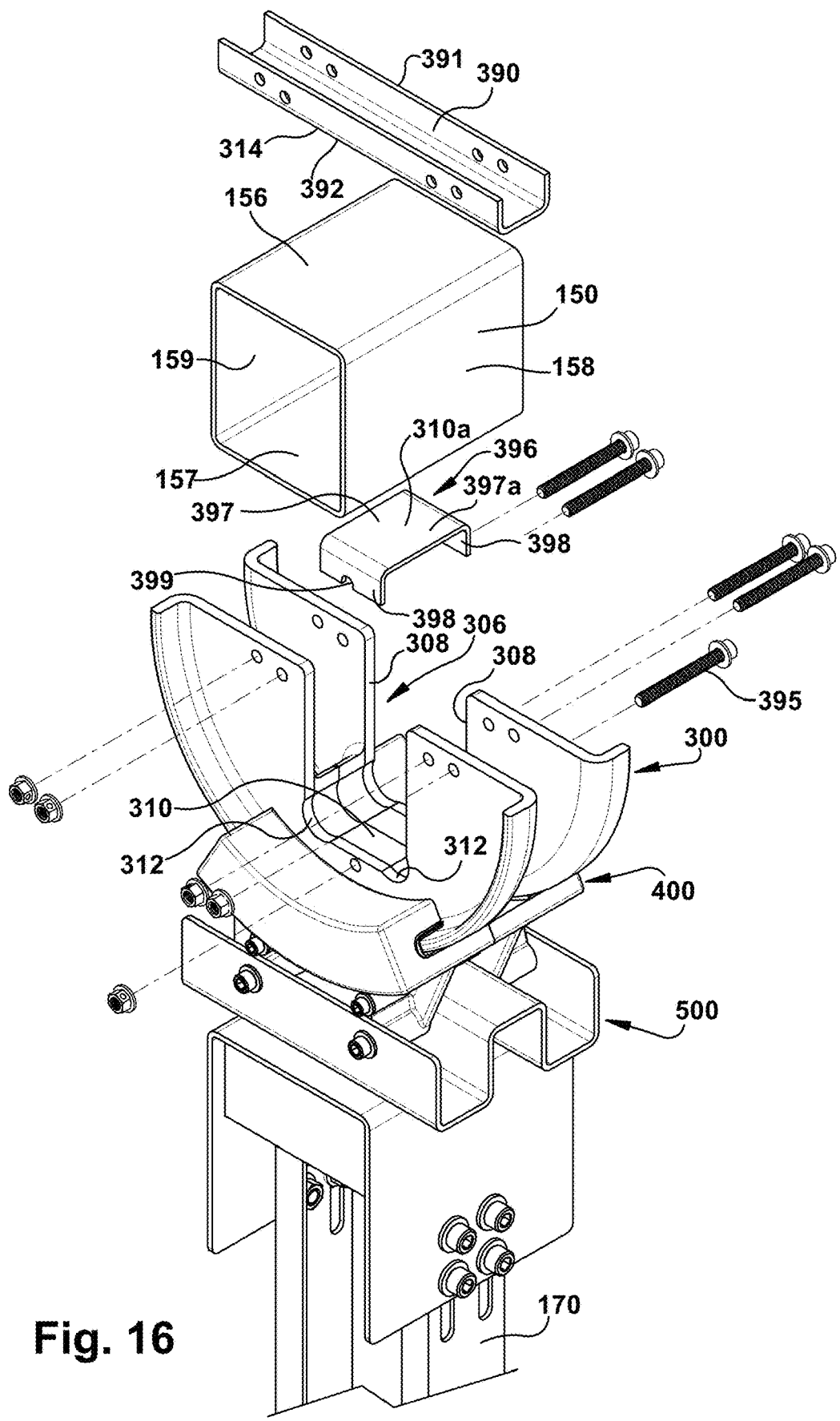
FIG. 16 is a schematic exploded front perspective view of the solar tracker bearing apparatus of FIG. 14.

As best seen in FIG. 8, in one exemplary embodiment, the axis of rotation R of the rotatable bearing assembly is spaced from and is outside of the beam slot 306, as defined by beam slot walls 314, 310, 308 and the axis of rotation R is vertically aligned with and spaced above the central beam slot axis BSA. As best seen in FIG. 15, the beam slot 306 of the rotatable bearing assembly 300 has a depth D. Advantageously, as schematically depicted in FIGS. 14-16, a shim 396 may be affixed to the rotatable bearing assembly 300 and a horizontal central portion 397 of the shim 396 extends through the beam slot 306. The horizontal central portion 397 of the shim 396 is adjacent to and overlies a bottom wall 310 of the beam slot 306 and bears against a lower wall 157 of the torque tube beam 150 thereby effectively vertically raising the torque tube beam 150 by a thickness T (FIG. 15) of the horizontal central portion 397 of the shim 396 with respect to the bottom wall 310 of the beam slot 306. That is, when the shim 396 is in place (as shown in FIGS. 14-16) the effective bottom wall 310a of the beam slot 306 is an upper surface 397a of the horizontal central portion 397 of the shim 396. Positioning the shim 396 adjacent the bottom wall 310 of the beam slot 310 advantageously adjusts or raises in the upward vertical direction V the center of mass CM of the table 110 to thereby more closely align the center of mass CM of the table 110 with the axis of rotation R of the solar tracker bearing apparatus 200. That is, without the use of a shim 396, e.g., FIG. 8, if the center of mass CM of the table 110 is vertically below the axis of rotation R of the plurality of solar tracker bearing apparatuses 200, the shim 396 having an appropriate thickness T of the horizontal central portion 397 is selected and installed in the beam slot 306 of the rotatable bearing assembly 300 of each solar tracker bearing apparatus 200. By doing so, the center of mass CM of the table 110 may advantageously be raised upwardly in the vertical direction V by the thickness T such that the center of mass CM table 100 is closer to alignment with the axis of rotation R of the plurality of solar tracker bearing apparatuses 200. As such and advantageously, the center of mass CM of the table 110 may be adjusted through the use of a selected shim 396, or the absence of a shim 396, in the beam slot 306 to change the vertical position of the center of mass CM of the table 110 and thereby come closer to the objective of having the axis of rotation R of the plurality of solar tracker bearing apparatuses 200 pass through or pass as close as possible to the center of mass CM of the table 110. The closer the axis of rotation R of the plurality of solar tracker bearing apparatuses 200 is to passing as close as possible to the center of mass CM of the table 110, the more nearly the table 110 is in balance.

As can be seen in a comparison of FIGS. 8 and 15, if no shim 396 is present in the beam slot 306 to elevate the torque tube beam 150 (and thereby elevate the center of mass CM of the table 110), the central beam slot axis BSA of the beam slot 306 is coincident with the longitudinal axis LA of the torque tube beam 150 (FIG. 8) and if the shim 396 is present in the beam slot 306 such that the torque tube beam 150 is elevated in the vertical direction V, the central beam slot axis BSA of the beam slot 306 is still coincident with the longitudinal axis LA of the torque tube beam 150 because the effective lower wall 310a of the beam slot 306 is defined by the upper surface 397a of the horizontal central surface 397 of the shim 396. In one exemplary embodiment, the thickness T of the shim 396 is 0.120 in.

As mentioned previously, the solar tracker system 100 includes the frame 120 comprising the torque tube beam 150 and the array of orthogonally oriented module rails 130 which are affixed to the torque tube beam 150 by brackets 160. Fasteners may also be used in place of or in addition to brackets. The plurality of photovoltaic panels or modules 190 (only an exemplary one of which is shown in FIG. 1) are supported between adjacent pairs of the module rails 130. A typical size of a photovoltaic panel 190 is one meter by two meters. Thus, a width W of the table 110 of the solar tracker system 100, in one exemplary embodiment, is approximately two meters.

A length L of the table 110 of the solar tracker system 100 is primarily determined by an extent or length of the torque tube beam 150. In one exemplary embodiment, the torque tube beam 150 is comprised of a plurality of predetermined lengths or segments, i.e., 40 foot segments, which are coupled together in an end to end configuration by collars. For simplicity, in FIG. 1, a shortened, schematic version of the torque tube beam 150 is shown. In one exemplary embodiment, the torque tube beam 150 includes a first portion 152 and a second portion 154 extending from either side of the actuator/controller mechanism, namely, the slew drive 180. That is, the slew drive 180, which rotates the torque tube beam 150, bisects or interrupts the torque tube beam 150 at or near a longitudinal center along the length L of the beam 150, The first portion 152 of the torque tube beam 150 extends from a first coupler 182 affixed to one side of the slew drive 180, while the second portion 154 of the torque tube beam 150 extends from a second coupler (not shown) affixed to an opposite side of the slew drive 180. As noted above, the schematic representation of the solar tracking system 100 depicted in FIG. 1 includes a relatively short toque tube beam 150. In reality, the length of the torque tube beam 150 may include five 40 foot beam segments comprising the first portion 152 of the torque tube beam 150 and five 40 foot beam segments comprising the second portion 154 of the torque tube beam 150 for a total length of approximately 400 feet and an ability to over 100 photovoltaic modules 190.

The plurality module rails 130 are typically oriented in an east-west orientation and the supported photovoltaic modules 190, which may extend beyond the ends of modules rails 130, define the width W of the table 110, while the torque tube beam 150 is typically oriented in a north-south orientation and defines the length L of the table 110. Each of the plurality of module rails 130 are affixed to the torque tube beam 150 by a support bracket 160. The torque tube beam 150 extends in a north-south direction, while the plurality of module rails 130 extend in an east-west direction 120. In one exemplary embodiment, the torque tube beam 150 is substantially square in cross section, having a hollow interior, and is centered about a torque tube beam longitudinal axis LA. In one exemplary embodiment the torque tube beam 150 is approximately 100 mm. by 100 mm. (approximately 4 in. by 4 in.).

The solar tracker system 100 further includes the plurality of spaced apart aligned upright support posts 170 which are anchored to or anchored in a substrate G (FIG. 2), such as the ground or a roof of a building. To minimize torque load on the posts 170, the posts 170 typically extend upwardly in the vertical direction V. The plurality of upright support posts 170 are aligned along an extent or length of the torque tube beam 150 and are spaced apart, typically uniformly, along the length of the torque tube beam 150. Each post 170 includes a center line or central vertical axis PCVA (FIG. 2) that extends through an approximate cross sectional center of the support post 170. Ideally, if the support post 170 is installed properly, the post center line or central vertical axis PCVA would be vertical. However, due to terrain difficulties and other installation issues, it may be the case that the post center line PCVA is slightly off vertical, resulting in one type of misalignment condition. Further, ideally, each of the plurality of support posts 170 would be positioned such that a vertical center line CLP of each support post 170 would intersect the longitudinal axis LA of the torque tube beam 150. Again, however, due to terrain difficulties and other installation issues, it may be the case that the post center line PCVA does not intersect the longitudinal axis LA of the torque tube beam 150, resulting in another type of misalignment condition. Moreover, each support post 170 includes a pair of spaced apart side walls 174. Each of the side walls 174 include a pair of vertically oriented mounting slots 176. Ideally, each of the plurality of support posts 170, when installed, would have the side walls 174 oriented such that they are parallel to the longitudinal axis LA of the torque tube beam 170. Again, however, due to terrain difficulties and other installation issues, it may be the case that the post side wall 174 that include the mounting slots 176 are off from being parallel with the longitudinal axis LA of the torque tube beam 170, resulting in yet another type of misalignment condition. Advantageously, the solar tracker bearing apparatus 200 of the present disclosure provides for mounting adjustability in the mounting and orientation of the solar tracking bearing apparatus 200 to an upper mounting portion 172 of the support post 170 to account for several common misalignment conditions. That is, a connecting structure or assembly 500 and a lower coupling portion 402 of a saddle assembly 400 of the solar tracker bearing apparatus 200 have sufficient degrees of freedom or ranges of adjustability when coupled to the upper mounting portion 172 of the support post 170 to account for several of such misalignment conditions (within limits of the ranges of adjustability provided by the connecting assembly 500 and the saddle assembly 400).

Figure 2:
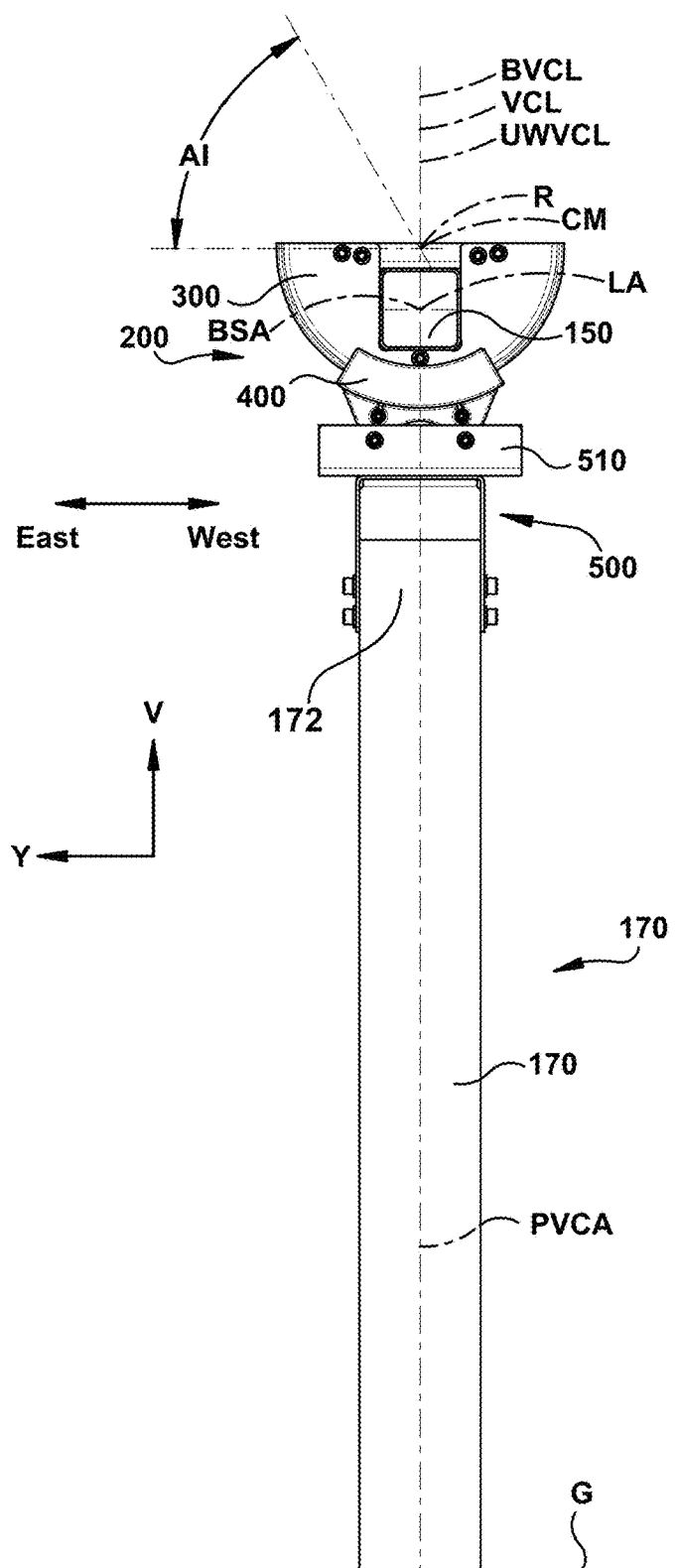
FIG. 2 is a schematic front elevation view of a first exemplary embodiment a solar tracker bearing apparatus of the present disclosure mounted to the upper mounting portion of a support post.
Figure 3:
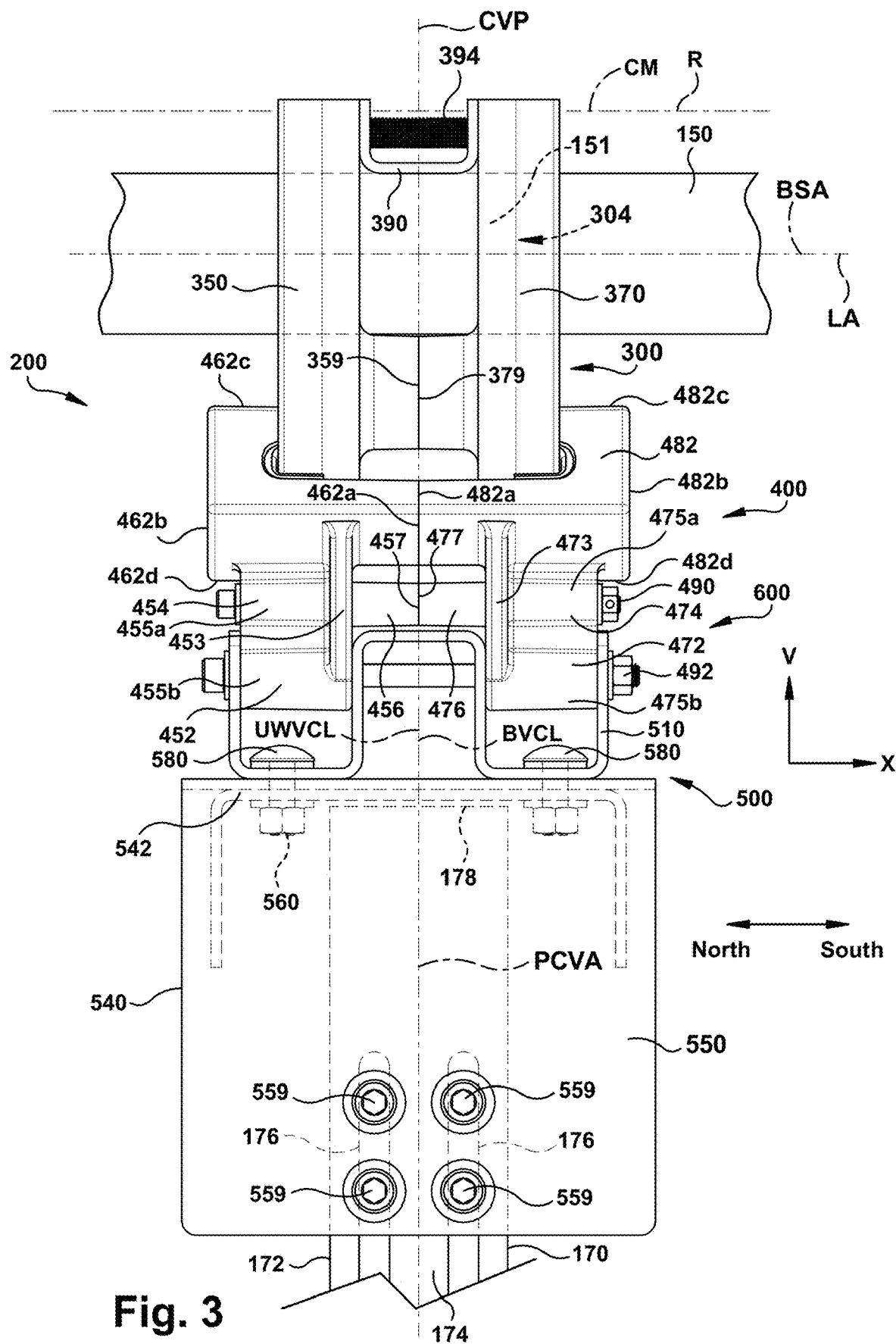
FIG. 3 is a schematic side elevation view of the solar tracker bearing apparatus of FIG. 2 and additionally includes a portion of a torque tube beam of a frame assembly of the solar tracker assembly.

As best seen in FIGS. 3-9, mounted to the upper mounting portion 172 of each support post 190 is the solar tracker bearing apparatus 200 which receives and rotatably supports a longitudinally extending portion of the torque tube beam 150. As mentioned previously, the solar tracker system 100 further includes the controller mechanism, such as the slew motor 180, which is coupled to the torque tube beam portions 152, 154 and acts to change an angle of inclination AI (FIG. 2) of the table 110 and thereby adjust light receiving surfaces of the plurality of photovoltaic modules 190 to track the movement of the sun across the sky from east to west so that the photovoltaic modules 190 are maximally exposed to the sun to throughout the day, within the limits or the range of the angle of inclination AI as provided by the slew motor 180 and the configuration of the table 110. It should be understood that the angle of inclination AI shown in FIG. 2 represent a maximum rotational or pivotal movement of a rotatable bearing assembly 300 of the solar tracker bearing apparatus 200 about its axis of rotation R in one direction (shown in dashed line in FIG. 2 as a clockwise rotation about the axis of rotation R) with respect to a home position of the rotatable bearing assembly 300 (shown in solid line). The rotatable bearing assembly 300 may also rotate or pivot in an opposite direction, a counter-clockwise direction, an angular movement or rotation equal to angle of inclination AI.

Solar Tracker Bearing Apparatus 200

As noted above, the number of solar tracker bearing apparatuses 200 in a solar tracker system 100 will depend on the number of upright support posts 170. Typically each support post 170 will include a solar tracker bearing apparatus 200 affixed to the upper mounting portion 172 of the post 170 and, thus, the torque tube beam 150 will be supported along its length or extent by a plurality spaced apart bearing apparatuses 200. Each bearing apparatus 200 will receive and provide bearing support to a longitudinally extending portion 151 of the torque tube beam 150 and each bearing apparatus 200 thus will support a portion of the total weight of the torque tube beam 150, the frame 120 and the plurality of photovoltaic modules 190. Typically, the torque tube beam 150 will be oriented in a generally north-south horizontal position such that as the table 110 pivots, the angle of inclination AI of the table 110 changes to track the sun across the sky from east to west to keep the light receiving surfaces of the plurality of photovoltaic modules 190 aimed, to the extent possible, at the sun to maximize sunlight exposure of the modules 190 throughout the day.

Each solar tracker bearing apparatus 200 of the plurality of solar tracker bearing apparatuses is substantially identical and includes the rotatable bearing assembly 300 supported for pivoting or rotation about the axis of rotation R by the stationary saddle assembly 400. The rotatable bearing assembly 300 of the solar tracker bearing apparatus 200 is pivotal along a single axis or axis of rotation R. Thus, the bearing apparatus 200 may be referred to as a single axis bearing assembly or single axis tracker. For simplicity purposes, reference to the solar tracker bearing apparatus 200 will be understood to apply to each of the plurality of solar tracker bearing apparatuses 200 utilized in a specific solar tracker system 100. Further, the axis of rotation R of the respective rotatable bearing assemblies 300 of each solar tracker bearing apparatus 200 of the solar tracker assembly 100 is substantially aligned or coincident and is spaced from and parallel to the longitudinal axis LA of the torque tube beam 150. As used herein, a direction X (or X direction) is a horizontal direction that is orthogonal to the vertical direction V and is substantially parallel to the longitudinal axis LA of the torque tube beam 150 and is substantially parallel to the axis of rotation R of each of the solar tracker bearing apparatuses 200. Assuming that the torque tube beam 150 extends in a generally north-south horizontal direction as mentioned above, the direction X as used herein will be a north-south horizontal direction. Thus, the direction X is parallel to the axis of rotation R of the rotatable bearing assembly 300 of any given solar tracker bearing apparatus 200. Similarly, as used herein, a direction Y (or Y direction) is a horizontal direction that is orthogonal to the vertical direction V and is substantially orthogonal to the longitudinal axis LA of the torque tube beam 150 and is substantially orthogonal to the axis of rotation R of each of the solar tracker bearing assemblies 200, that is, the direction Y as used herein will be an east-west horizontal direction.

In one exemplary embodiment, the solar tracker bearing apparatus 200 of the present disclosure includes the rotatable bearing assembly 300 supported for rotation about the axis of rotation R by the stationary saddle assembly 400. The solar tracker bearing apparatus 200 further includes the connecting assembly 500 for adjustably securing the saddle assembly 400 to the upper mounting portion 172 of the post 170. In one exemplary embodiment, the connecting assembly 500 affixes a lower coupling portion 402 of the saddle assembly 400 to the upper mounting portion 172 of the support post 150.

Figure 4:
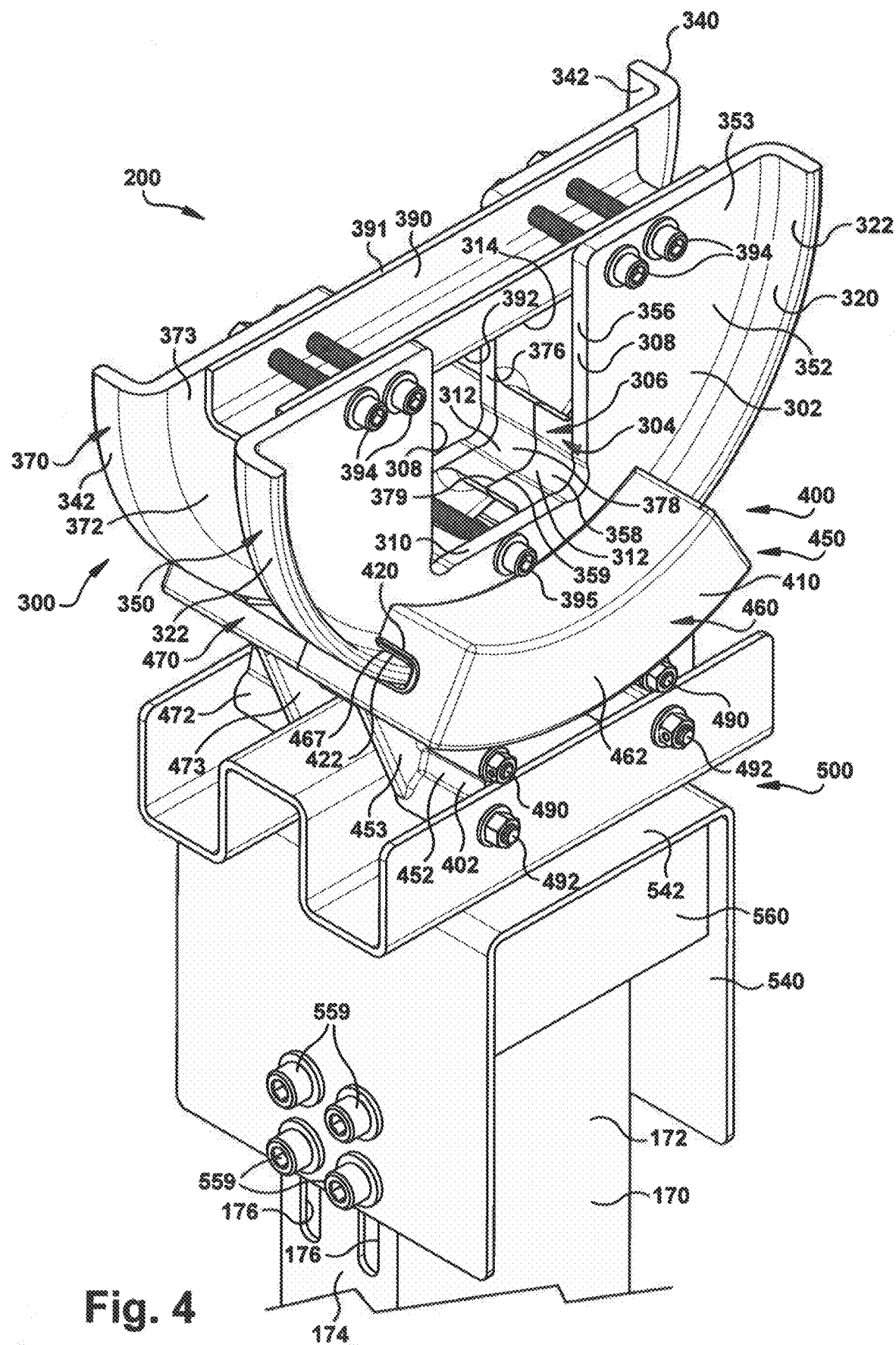
FIG. 4 is a schematic perspective view of the solar tracker bearing apparatus of FIG. 2.
Figure 5:
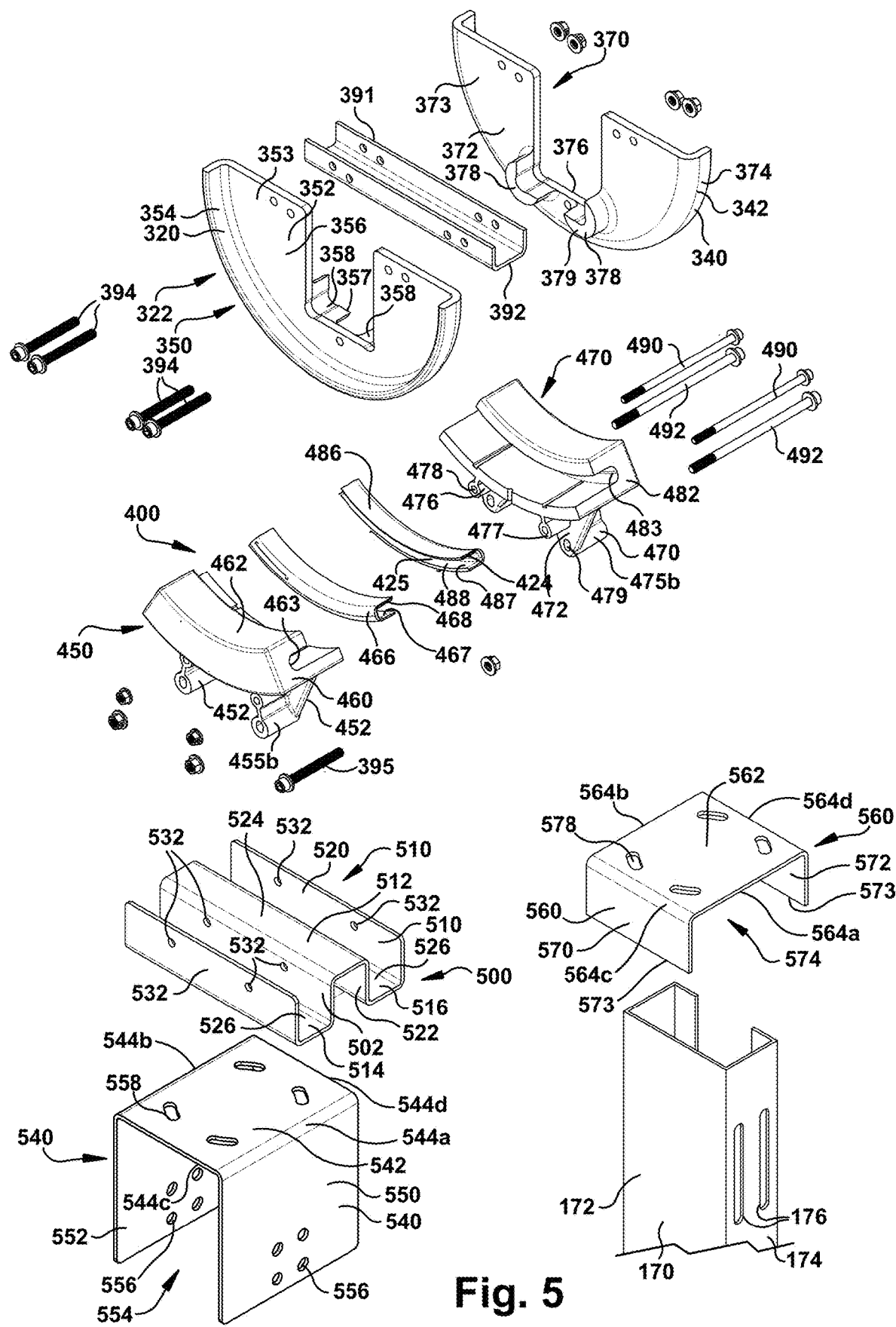
FIG. 5 is a schematic exploded perspective view of the solar tracker bearing apparatus of FIG. 2.
Figure 6:
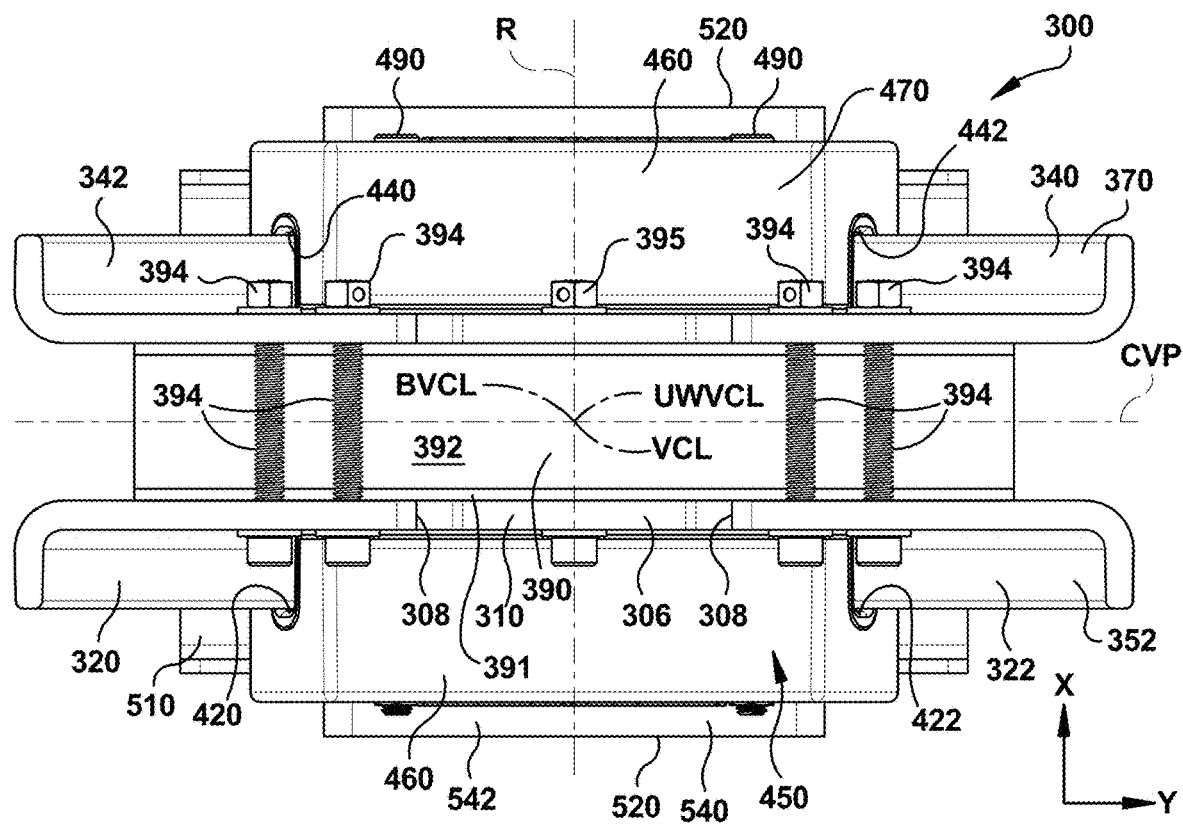
FIG. 6 is a schematic top plan view of the solar tracker bearing apparatus of FIG. 2 with a hold down bracket of a rotatable bearing assembly of the solar tracker bearing apparatus removed for clarity.
Figure 7:
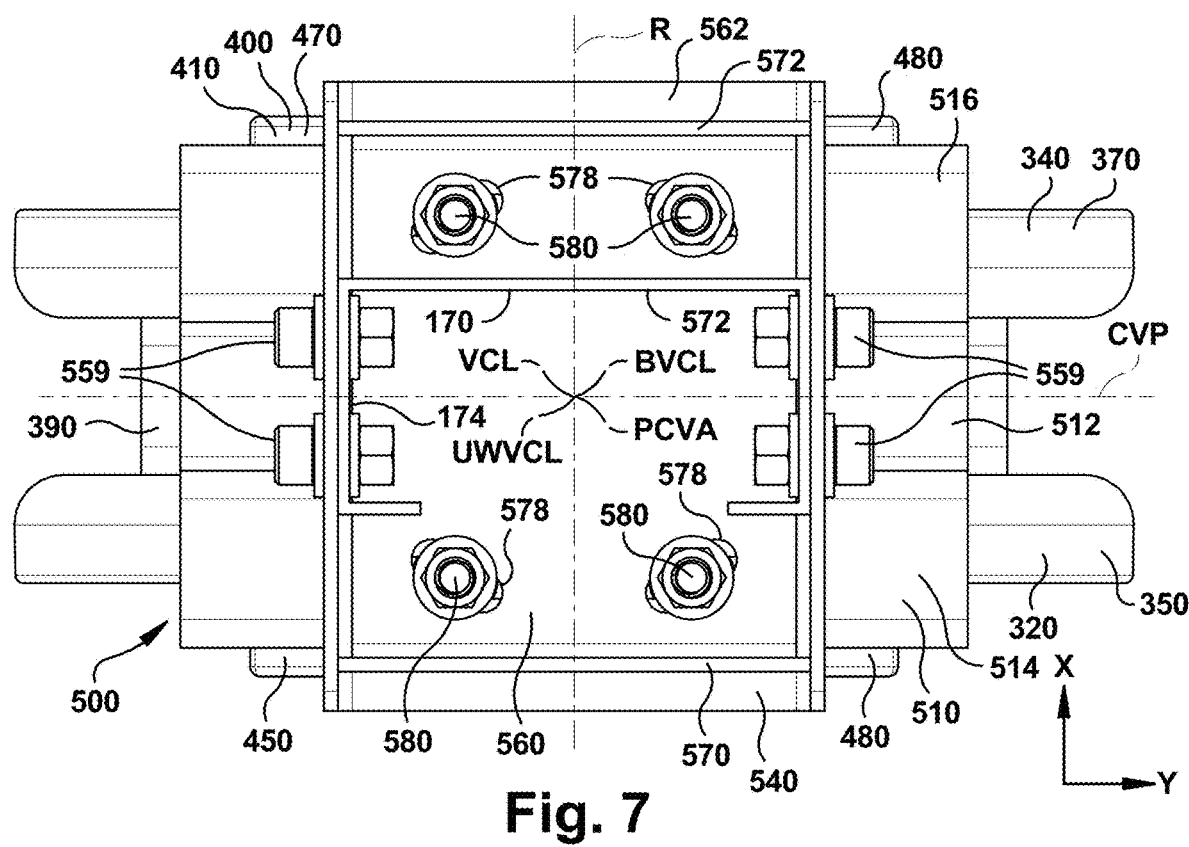
FIG. 7 is a schematic bottom plan view of the solar tracker bearing apparatus of FIG. 2.

As best seen in FIGS. 4-6, in one exemplary embodiment, the rotatable bearing assembly 300 includes a central portion 302 and first and second spaced apart arcuate peripheral portions 320, 340. The central portion 302 of the bearing assembly 300 includes a channel 304 defining the beam slot 306 for receiving the torque tube beam 150, The beam slot 306 includes spaced apart vertical side walls 308 and the horizontally extending lower wall 310 for receiving and abutting the lower wall 157 and the horizontally extending upper wall 314 abutting the upper wall 156 of the square cross sectional shape of the torque tube beam 150. The first peripheral portion 320 of the bearing assembly 300 includes a first arcuate rim bearing 322 and the second peripheral portion 340 includes a second arcuate rim bearing 342. The first and second rim bearings 322, 342 are spaced apart as viewed in an axial direction, that is, as measured or viewed along the axis of rotation R of the rotatable bearing assembly 300 (stated another way, spaced apart as measured in the horizontal direction X) and are centered about the axis of rotation R. Further, the first and second rim bearings 322, 342, as viewed with respect to the axis of rotation R, have the same radius or radius of curvature RC (shown schematically in FIG. 8), that is, the first and second rim bearings 322, 342 would lie on the surface of a right angle or right cylinder extending along and centered about the axis of rotation R and having a radius RC. To facilitate a flush fit between the portion 151 of the torque tube beam 150 received in the beam slot 306 and, specifically, to facilitate a flush fit between side walls 158 of the torque tube beam portion 151 and the opposing side walls 308 of the beam slot 306 and between the lower wall 157 of the torque tube beam portion 151 and the bottom wall 310 of the beam slot 306 and to facilitate ease of removal of the torque tube beam portion 151 from the beam slot 306, there are double radius recesses 312 forming the corner transitions between the opposing side walls 308 and the bottom wall 310 of the beam slot 306.

In one exemplary embodiment, the stationary saddle assembly 400 includes the lower coupling portion 402, adapted to be affixed to the connecting assembly 500, and an upper bearing portion 410, for pivoting support of the rotatable bearing assembly 300. The upper support portion 410 of the saddle assembly 400 includes a first arcuate slot 420 and a second arcuate slot 440. The first arcuate slot 420 includes a first arcuate bearing race 422 and the second arcuate slot 440 includes a second arcuate bearing race 442. The first and second arcuate bearing races 422, 442 are spaced apart as viewed in an axial direction, that is, as measured or viewed along the axis of rotation R of the rotatable bearing assembly 300 (stated another way, spaced apart as measured in the horizontal direction X) and are centered about the axis of rotation R. Further, the first and second arcuate bearing races 422, 442, as viewed with respect to the axis of rotation R, have the same radius or radius of curvature RC as the first and second rim bearings 322, 342. That is, the first and second arcuate bearing races 422, 442 would lie on the surface of a right cylinder extending along and centered about the axis of rotation R and having a radius RC. The first arcuate bearing race 422 slidably supports the first arcuate rim bearing 322 of the rotatable bearing assembly 300 and the second arcuate bearing race 442 slidably supports the second arcuate rim bearing 342 of the rotatable bearing assembly 300 such that the arcuate or pivoting movement of the rotatable bearing assembly 300 is centered about the axis of rotation R.

As best seen in FIG. 5, in one exemplary embodiment, the rotatable bearing assembly 300 and the stationary saddle assembly 400 of the solar tracker bearing apparatus 200 are both two part assemblies that are symmetric about a central vertical plane CVP (FIGS. 3, 6 and 7) extending through the solar tracker bearing apparatus 200. The central vertical plane CVP of the solar tracker bearing apparatus 200 is parallel to and aligned with the central vertical axis PCVA of the support post 170 and extends orthogonally to and is intersected by the axis of rotation R of the rotatable bearing assembly 300, that is, the central vertical plane CVP of the solar tracker bearing apparatus 200 extends in the vertical direction V. The central vertical plane CVP of the solar tracker bearing apparatus 200 includes a vertical center line VCL (FIGS. 6 and 7) of the apparatus 200 that intersects and is orthogonal to the axis of rotation R of the rotatable bearing assembly 300. In one exemplary embodiment, the rotatable bearing assembly 300 includes first and second bearing members 350, 370 and the saddle assembly 400 includes first and second saddle members 450, 470. Because the first and second bearing members 350, 370 are symmetrical about the central vertical plane CVP, advantageously, the members 350, 370 are identical, leading to significant efficiencies in the manufacture of the rotatable bearing assembly 300 and reducing inventory requirements. Similarly, because the first and second saddle members 450, 470 are symmetrical about the central vertical plane CVP, advantageously, the members 450, 470 are identical, leading to significant efficiencies in the manufacture of the saddle assembly 300 and reducing inventory requirements.

Rotatable Bearing Assembly 300

The first bearing member 350 of the rotatable bearing assembly 300 is generally semicircular including a generally planar central region 352 and a laterally extending peripheral rim 354. The planar central region 352 is substantially parallel to but spaced laterally from the central vertical plane CVP of the solar tracker bearing apparatus 200. The central region 352 includes a generally U-shaped cut-out 356. Extending laterally from the planar central region 352 adjacent the U-shaped cut out 356 are a pair of projections 358. The pair of projections 358 extend laterally from the central portion in a direction opposite the peripheral rim 354 and form a portion of the U-shaped cut out 356. Similarly, the second bearing member 370 is generally semicircular including a generally planar central region 372 and a laterally extending peripheral rim 374. The planar central region 372 is substantially parallel to but spaced laterally from the central vertical plane CVP of the solar tracker bearing apparatus 200. The central region 372 includes a generally U-shaped cut-out 376. Extending laterally from the planar central region 352 adjacent the U-shaped cut-out 376 are a pair of projections 378. The pair of projections 378 extend laterally from the central portion in a direction opposite the peripheral rim 374 and form a portion of the U-shaped cut-out 376.

The central portion 302 of the rotatable bearing assembly 300 is defined by the spaced apart planar central regions 352, 372, along with the pairs of projections 358, 378, of the first and second bearing members 350, 370. The beam slot 306 of the rotatable bearing assembly 300 receives and supports the torque tube beam 150 is defined by the U-shaped cut-outs 356, 376 of the first and second bearing members 350, 370. Advantageously, because of the respective pairs of projections 358, 378 extend laterally from the central portions 352, 372 and, thus, function to space apart the central portions 352, 372 of the first and second bearing members 350, 370, an axial extent of the beam slot 306, that is, an extent of the beam slot 306 as measured with respect to the axis of rotation R (or as measured along the horizontal direction X) is large. This advantageously provides for increased area of support and thus increased stability in support of the torque tube beam 150 as it is received in the beam slot 306 and is pivotally supported by the bearing assembly 300. The generally U-shaped hold down bracket 390 is disposed between respective upper portions 353, 373 of the central regions 352, 372 of the first and second bearing members 350, 370. The hold down bracket 390 functions to both secure a portion 151 of the torque tube beam 150 disposed within the beam slot 306 and laterally space apart the central portions 352, 372 of the first and second bearing members 350, 370. The torque tube beam 150 is confined from movement within the beam slot 306 by beam slot bottom wall 310, a pair of beam slot side walls 308 and the upper wall 314 defined by the lower or bottom wall or end 392 of the hold down bracket 390.

The first and second bearing members 350, 370 are secured via four fasteners 394 that extend in the direction X though aligned apertures of the first and second bearing members 350, 370 and aligned horizontal apertures in the hold down bracket 390 which functions to laterally space apart the first and second bearing members 350, 370. It should be understood, of course, that if a shim 396 is utilized and the position of the torque tube beam 150 within the beam slot 306 is raised, a different configuration of the hold down bracket 390 will have to be utilized to abut the upper wall 156 of the torque tube beam 150 and still allow the aligned apertures of the hold down bracket 390 to receive the four fasteners 394 that extend though the hold down bracket 390 and the aligned apertures of the first and second bearing members 350, 370. The pair of projections 358, 378 also function to laterally space the first and second bearing members 350, 370 and horizontal surfaces of the projections 358, 378 form portions of the bottom wall 310 of the beam slot 306. Facing surfaces 357, 377 of the respective pairs of projections 358, 378 abut and function to space apart the respective planar central regions 352, 372. The facing surfaces 359, 379 of the respective pairs of projections 358, 378 are positioned along and are coincident with the central vertical plane CVP of the solar tracker bearing apparatus 200.

A fifth fastener 395 extends to align apertures of the central portions 352, 372 of the first and second bearing members 350, 370 in the region of the projections 358, 378 to additionally secure the first and second bearing members 350, 370. Additionally, to the extent a shim 396 is used to raise the center of mass CM of the table 110, the fifth fastener 395 extends through aligned inverted U-shaped recesses or openings 399 formed in lower edges of vertically extending legs 398 of the shim 396 to affix the shim 396 to the first and second bearing members 350, 370 such that the horizontal central portion 397 is disposed against and overlies the bottom wall 310 of the beam slot 306. The upper surface 397a of the horizontal central portion 397 of the shim 396 in the beam slot 306 bears against the lower wall 157 of the torque tube beam 150 and thereby raises the torque tube beam 150 in the vertical direction V by a thickness T (FIG. 15) of the horizontal central portion 397 of the shim 396 and thus raises the center of mass CM of the table 110 by the same thickness T of the horizontal central portion 397 of the shim 396. In one exemplary embodiment, the fasteners 394, 395, as well as other fasteners referred to below, may be two-part threaded fasteners including a threaded bolt and threaded nut combination wherein the head of the bolt includes a hex drive socket for driving by a hex driver. As would be recognized by one of skill in the art, other types of fasteners may be utilized instead of or in combination with the two-part threaded fasteners shown in the drawings.

The laterally extending peripheral rim 354 defines the first arcuate rim bearing 322 of the first peripheral portion 320 of the bearing assembly 300, while the laterally extending peripheral rim 374 defines the second arcuate rim bearing 342 of the second peripheral portion 340 of the bearing assembly 300. Advantageously, since the peripherally rims 354, 374 extend away from the respective central regions 352, 372 of the first and second bearing members 250, 370, an axial distance, that is, a distance as measured along the axis of rotation R, between the first and second arcuate rim bearings 322, 342 is large. This large axial distance between bearing engagement surfaces of the rim bearings 322, 342 of the bearing assembly 300 and the bearing engagement surfaces of the first and second bearing races 422, 442 of the saddle assembly 400 advantageously provides for improved bearing support and improved stability for the bearing assembly 300 as it rotates with respect to the saddle assembly 400 about the axis of rotation R. In one exemplary embodiment, as measured with respect to the axis of rotation R, the angular or arcuate extent of the first and second rim bearings 322, 342 is approximately 181.75 degrees. If the arcuate extent of the first and second rim bearings 322, 342, was exactly 180 degrees, then the axis of rotation R would pass through a point along an upper end 391 of the hold down bracket 390 and would be centered between the opposing side walls 308 of the beam slot 306. Since, in the exemplary embodiment, the arcuate extent of the first and second rim bearings 322, 342 is slightly greater than 180 degrees, as can best be seen in FIGS. 3 and 8, the axis of rotation R passes through a point somewhat vertically below the upper end 391 of the hold down bracket 390 and would be centered between the opposing side walls 308 of the beam slot 306. If, in another exemplary embodiment, the arcuate extent of the first and second rim bearings 322, 342 is somewhat less than 180 degrees, the axis of rotation R would pass through a point somewhat vertically above the upper end 391 of the hold down bracket 390 and would be centered between the opposing side walls 308 of the beam slot 306. In one exemplary embodiment, as shown, for example, in FIG. 8, without the use of the shim 396, the axis of rotation R is approximately 2.99 inches vertically above the longitudinal axis of the torque tube beam 150 and the same distance vertically above the central axis BSA of the beam slot 306. In one exemplary embodiment, as measured with respect to the axis of rotation R, the angular or arcuate extent of the first and second bearing races 422, 442 of the saddle assembly 400 is approximately 60 degrees. Accordingly, in one exemplary embodiment, the angle of inclination AI of the solar tracker bearing apparatus 200 is approximately +/−60 degrees (or 120 degrees of total angular pivot of the table 110).

Saddle Assembly 400

As best seen in FIGS. 3-5 and 10, the saddle assembly 400 includes a lower coupling portion 402 and the upper bearing portion 410. As noted above, the upper bearing portion 410 includes a includes the first arcuate slot 420 and the second arcuate slot 440. The first arcuate slot 420 includes the first arcuate bearing race 422 and the second arcuate slot 440 includes the second arcuate bearing race 442. The first and second arcuate bearing races 422, 442 are spaced apart as viewed in an axial direction, that is, as measured or viewed along the axis of rotation R of the rotatable bearing assembly 300 (stated another way, spaced apart as measured in the horizontal direction X) and are centered about the axis of rotation R. The first arcuate bearing race 422 slidably supports the first arcuate rim bearing 322 of the rotatable bearing assembly 300 and the second arcuate bearing race 442 slidably supports the second arcuate rim bearing 342 of the rotatable bearing assembly 300 such that the arcuate or pivoting movement of the rotatable bearing assembly 300 is centered about the axis of rotation R.

The first arcuate bearing race 422, when viewed in cross section is a horizontally oriented U-shaped surface 423, with the opening of the U-shaped surface 423 facing toward the vertical center line VCL of the solar tracker bearing apparatus 200 or, stated another way, facing toward the central vertical plane CVP of the apparatus 200. The U-shaped surface 423 of the first arcuate bearing race 422 includes an arcuate inner bearing surface or race 424 and a radially spaced apart arcuate outer bearing surface or race 425, both centered about the axis of rotation R of the rotatable bearing assembly 300 and the inner arcuate bearing race 424 being closer to the axis of rotation R than the arcuate outer bearing race 425. The inner bearing race 424 providing sliding bearing support for an arcuate inner surface 324 of the first arcuate rim bearing 322 and the outer bearing race 425 providing sliding bearing support for an arcuate outer surface 325 of the first arcuate rim bearing 322.

The second arcuate bearing race 442, when viewed in cross section is a horizontally oriented U-shaped surface 443, with the opening of the U-shaped surface 443 facing toward the vertical center line VCL of the solar tracker bearing apparatus 200 or, stated another way, facing toward the central vertical plane CVP of the apparatus 200. The U-shaped surface 443 of the first arcuate bearing race 442 includes an arcuate inner bearing surface or race 444 and a radially spaced apart arcuate outer bearing surface or race 445, both centered about the axis of rotation R of the rotatable bearing assembly 300 and the inner arcuate bearing race 444 being closer to the axis of rotation R than the arcuate outer bearing race 445. The inner bearing race 444 providing sliding bearing support for an arcuate inner surface 344 of the second arcuate rim bearing 342 and the outer bearing race 445 providing sliding bearing support for an arcuate outer surface 345 of the second arcuate rim bearing 342.

In one exemplary embodiment, the saddle assembly 400 is a two piece assembly comprising the first and second saddle members 450, 470 which are identical and symmetric about the central vertical plane CVP of the solar tracker bearing apparatus 200. The first saddle member 450 includes an upper bearing region 460 and a lower support region 452. The lower support region 452 of the first saddle member 450 includes a downwardly or vertically extending generally planar flange 453. The vertical planar flange 453 includes a pair of bosses 454 extending laterally in a direction away from the central vertical plane CVP of the solar tracker bearing apparatus 200. Each of the pair of bosses 454 includes an upper cylindrical sleeve 455a and a lower cylindrical sleeve 455b, each of the sleeves 455a, 455b includes a horizontally extending aperture through the respective sleeves. The lower support region 452 of the first saddle member 450 also includes a pair of projections 456 extending laterally from the flange 453 in a direction toward the central vertical plane CVP. The pair of projections 456 include apertures that are aligned with the apertures of the upper cylindrical sleeve 455a, thus, providing a pair of horizontal throughbores 458 through the lower support region 452 of the first saddle member 450.

The second saddle member 470 includes an upper bearing region 480 and a lower support region 472. The lower support region 472 of the second saddle member 470 includes a downwardly or vertically extending generally planar flange 473, The vertical planar flange 473 includes a pair of bosses 474 extending laterally in a direction away from the central vertical plane CVP of the solar tracker bearing apparatus 200. Each of the pair of bosses 474 includes an upper cylindrical sleeve 475a and a lower cylindrical sleeve 475b, each of the sleeves 475a, 475b includes a horizontally extending aperture through the respective sleeves 475a, 475b. The lower support region 472 of the second saddle member 470 also includes a pair of projections 476 extending laterally from the flange 473 in a direction toward the central vertical plane CVP. The pair of projections 476 include apertures that are aligned with respective apertures of the upper cylindrical sleeve 475a of the pair of bosses 474. This alignment of respective apertures provides a pair of horizontal throughbores 478 through the lower support region 472 of the second saddle member 470.

Figure 10:
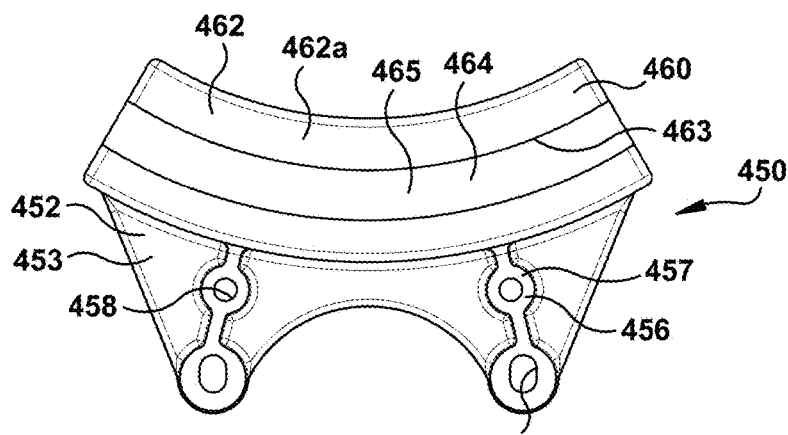
FIG. 10 is a schematic back plan view of a first saddle member of a saddle assembly of the solar tracker bearing apparatus of FIG. 2.
Figures 12, 13:
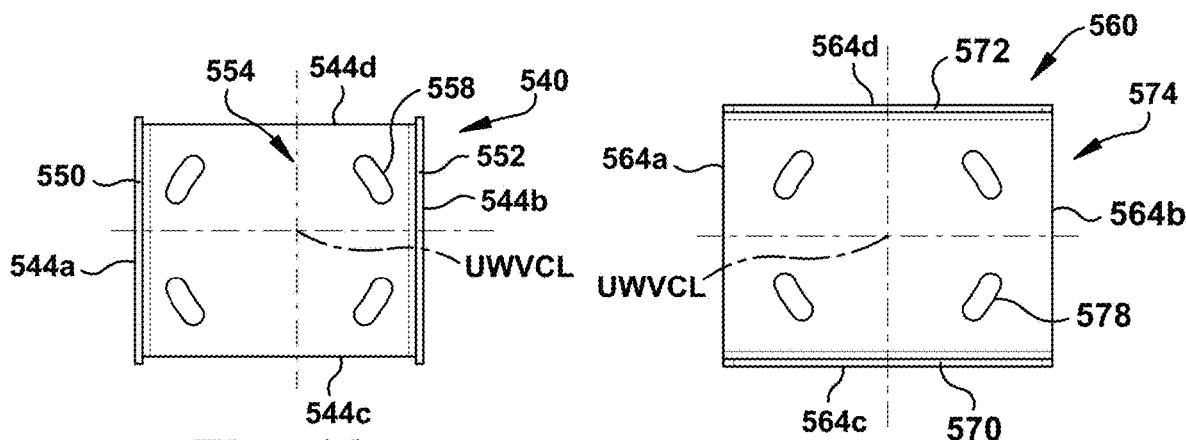
FIG. 12 is a schematic top plan view of a post cap of the connecting assembly of the solar tracker bearing apparatus of FIG. 2.
FIG. 13 is a schematic top plan view of a stiffener member of the connecting assembly of the solar tracker bearing apparatus of FIG. 2.

When the first and second saddle members 450, 470 are assembled, a pair of horizontally extending fasteners 490 extend through the aligned horizontal throughbores 458, 478 of the respective lower support regions 452, 472 of the first and second saddle member 450, 470 to secure the first and second saddle members 450, 470 together. Facing surfaces 457, 477 of the respective pairs of projections 456, 476 abut and function to axially space apart the respective planar flanges 453, 473 of the first and second saddle members 450, 470. The flanges 453, 473 are also axially spaced apart by an inverted U-shaped channel 512 of a horizontally oriented W brace 510 of the connecting assembly 500. The inverted U-shaped channel 512 of the horizontally oriented W brace 510, like the flanges 453, 473 of the first and second saddle members 450, 470 extend in the horizontal direction Y. The W brace 510 includes a pair of vertically oriented outer side walls 520 and a pair of vertically oriented inner side walls 522. A pair of horizontal fasteners 492 extend in the direction X through aligned apertures formed in the outer and inner side walls 520, 522 of the W brace 510 and the apertures extending through the respective the lower cylindrical sleeves 455b of lower support region 452 of first saddle member 450 and the lower cylindrical sleeves 475b of lower support region 472 of second saddle member 470 to secure the saddle assembly 400 to the W brace 510 and additionally secure the first and second saddle members 450, 470 together. As best seen in FIGS. 8 and 10, the apertures through the lower cylindrical sleeves 455b, 475b of the first and second saddle members 450, 470 constitute arched or arcuate slots 459, 479. The arcuate slots 459, 479 are concave with respect to the vertical center line VCL of the bearing assembly 200. Advantageously, the arcuate slots 459, 479 of the first and second saddle members 450, 470 provide for a tilt adjustability of the saddle member 400 with respect to the support post 170 to account for a misalignment condition referred to as a post tilt condition, as explained below. The lower support regions 452, 472 of the first and second saddle member 450, 470, as assembled, comprise the lower coupling portion 402 of the saddle assembly 400. Additionally, as the W brace 510 is assembled to the saddle assembly 400 and the saddle assembly 400 rotatably supports the bearing assembly 300, an assembled combination of the W brace 510 of the connecting assembly 500, the saddle assembly 400 and the rotatable bearing assembly 300 will be referred to as the assembled combination 600.

Figure 9:
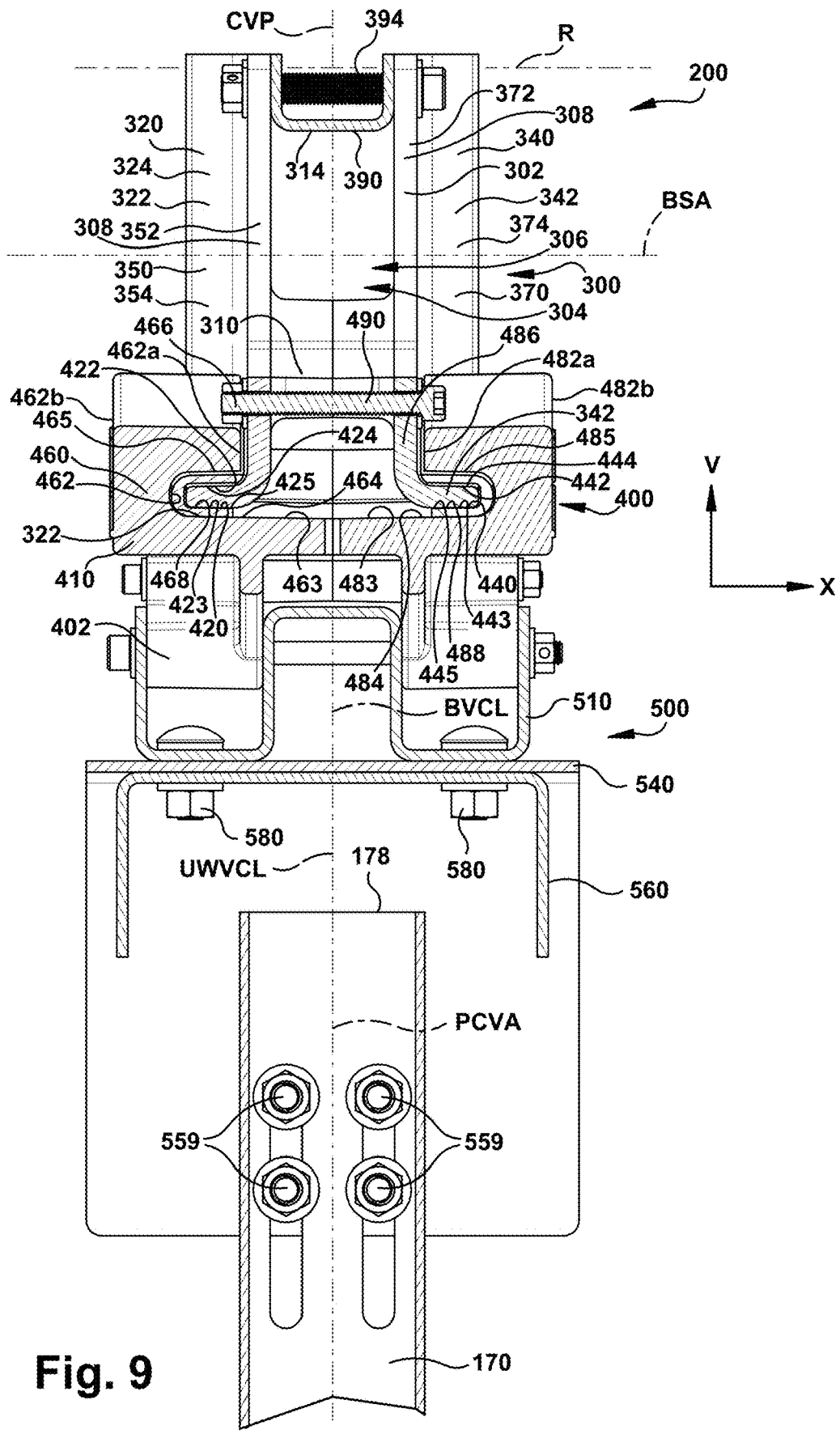
FIG. 9 is a schematic longitudinal section view of the solar tracker bearing apparatus of FIG. 2 as taken along an axis of rotation of the rotatable bearing assembly of the solar tracker bearing apparatus.
Figure 11:
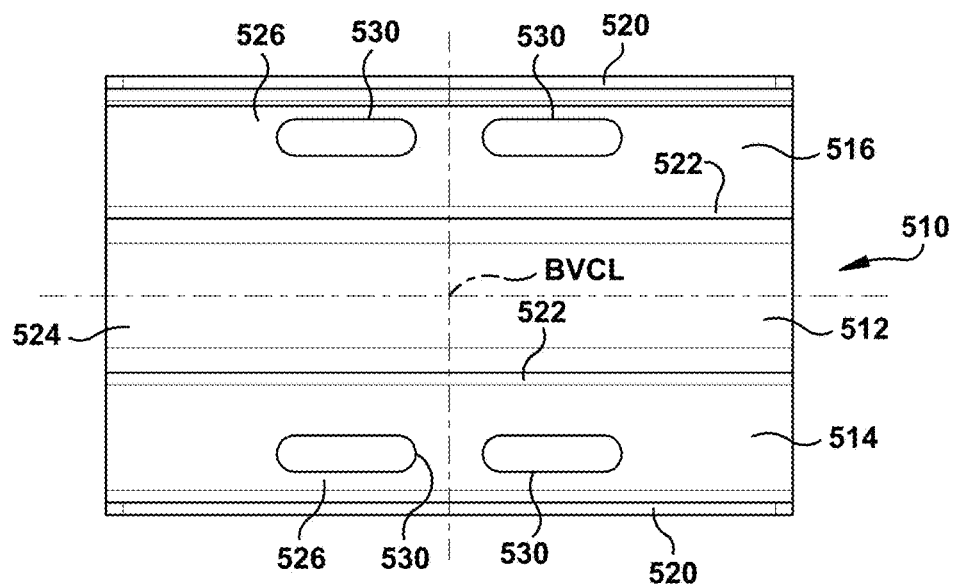
FIG. 11 is a schematic top plan view of a W brace of a connecting assembly of the solar tracker bearing apparatus of FIG. 2.

As best seen in FIGS. 8 and 9, in one exemplary embodiment, the upper bearing region 460 of the first saddle member 450 includes an arcuate body 462 which is generally rectangular in cross section including an inner wall 462a, an axially spaced apart outer wall 462b, an upper surface 462c and a radially spaced apart lower surface 462d. By radially spaced apart it is meant that the upper and lower surfaces 460c, 460d are spaced apart as measured along a radius line extending vertically downwardly from the axis of rotation R of the bearing apparatus 200, with the upper surface 460c being closer to the axis of rotation R. The upper surface 460c of the arcuate body 462 includes a J-shaped opening 463, as viewed in cross section FIG. 9). An interior region 464 of the J-shaped opening 463 defines a U-shaped slot 465. A low friction, durable U-shaped insert 466 is fixedly positioned in the U-shaped slot 465. The low friction insert 466 includes a U-shaped slot 467, as viewed in cross section. The U-shaped slot 467 of the insert 466 defines the U-shaped surface 423 and the inner and outer bearing races 424, 425 of the first bearing race 422 which slidingly receives the first arcuate rim bearing 322 of the first peripheral portion 320 of the rotatable bearing assembly 300. Stated another way, the U-shaped slot 467 of the insert 466 defines a first journal bearing race 468, comprising the first bearing race 422 of the upper bearing portion 410 of the saddle assembly 400 and the U-shaped slot 467 of the insert 466 defines the first arcuate slot 420 of the upper bearing portion 410 of the saddle assembly 400.

In one exemplary embodiment, the insert 466 is fabricated of a polymer such as acetal or polymer with glass or another filler or other material exhibits similar properties and/or characteristics. By way of example and without limitation, in one exemplary embodiment, the insert 466 is fabricated a polyoxymethylene thermoplastic polymer exhibiting high stiffness, low friction, dimensional stability and excellent wear and abrasion resistance or other material exhibiting similar characteristics. One commercially available polyoxymethylene thermoplastic polymer is Delrin® polymer available from E.I. DuPont DeNemours and Company, Wilmington, Del. It should be understood, of course, that the insert 466, while desirable, is optional, and the first bearing race 422 could be defined by the U-shaped slot 465 of the arcuate body 462, depending on the loading forces applied to the first bearing race 422, the material(s) that the arcuate body 462 is fabricated of and/or coatings applied to the arcuate body 462 in the region of the U-shaped slot 465, the durability desired and the coefficient of sliding friction desired for the first bearing race 422, among other factors.

Similarly, in one exemplary embodiment, the upper bearing region 480 of the second saddle member 470 includes an arcuate body 482 which is generally rectangular in cross section including an inner wall 482a, an axially spaced apart outer wall 482b, an upper surface 482c and a radially spaced apart lower surface 482d. The upper surface 480c of the arcuate body 482 includes a J-shaped opening 483, as viewed in cross section. An interior region 484 of the J-shaped opening 483 defines a U-shaped slot 485. A low friction, durable U-shaped insert 486 is fixedly positioned in the U-shaped slot 485. The low friction insert 486 includes a U-shaped slot 487, as viewed in cross section. The U-shaped slot 487 of the insert 486 defines the U-shaped surface 443 and the inner and outer bearing races 444, 445 of the first second race 442 which slidingly receives the second arcuate rim bearing 342 of the second peripheral portion 340 of the rotatable bearing assembly 300. Stated another way, the U-shaped slot 487 of the insert 486 defines a second journal bearing race 488 comprising the second bearing race 442 of the upper bearing portion 410 of the saddle assembly 400 and the U-shaped slot 487 of the insert 486 defines second arcuate slot 440 of the upper bearing portion 410 of the saddle assembly 400. As explained above with respect to the insert 466, it should be understood that the insert 486, while desirable, is optional, and the second bearing race 442 could be defined by the U-shaped slot 485 of the arcuate body 482, depending on the loading forces applied to the second bearing race 442, the material(s) that the arcuate body 483 is fabricated of and/or coatings applied to the arcuate body 483 in the region of the U-shaped slot 485, the durability desired and the coefficient of sliding friction desired for the second bearing race 442, among other factors.

Connecting Assembly 500

As best seen in FIGS. 3-5, 7-9 and 11-13, the connecting assembly 500 functions to couple the saddle assembly 400 of the solar tracker bearing apparatus 200 to the upper mounting portion 172 of the upright support post 170. The connecting assembly 500 includes the W brace 510, a post cap 540 which is affixed to the upper mounting portion 172 of the support post 150, and a stiffener member 560, which is interposed between the post cap 540 and an upper end 178 of the support post 150 and provides additional structural rigidity to the connecting assembly 500.

Advantageously, as mentioned previously, the connecting assembly 500, along with the lower coupling portion 402 of the saddle assembly 400, allows for adjustability in the mounting of the solar tracker bearing apparatus 200 to the upper mounting portion 172 of the support post 150 to account for the fact that given the terrain that the support posts 170 are installed, there are often various types of misalignment problems that must be accounted for in attempting to properly and precisely align, orient and position the beam slot 306 of the rotatable bearing assembly 300 of a given solar tracker bearing apparatus 200 to receive the torque tube beam 150. Misalignment problems between the support post 170 and the torque tube beam 150 can take various forms including: a) Post twist the side walls 170 of the support post 170 which include the pair of vertically extending slots 176 are not in alignment with the longitudinal axis LA of the torque tube beam 150. Thus, if the solar tracker bearing apparatus 200 were mounted to the support post side walls 170 with post twist adjustability, the axis of rotation R of the rotatable bearing assembly 300 of the solar tracker bearing apparatus 200 would not be parallel with the torque tube beam longitudinal axis LA. Such post twist condition would cause additional undesirable forces applied to both the rotatable bearing assembly 300, the saddle assembly 400 and the torque tube beam 150. b) Y direction misalignment—the vertical center line PCVA of the post 150 is orthogonal to but offset from the torque tube beam longitudinal axis LA. Such a Y direction misalignment condition would cause difficulty in positioning the torque tube beam 150 in the beam slot 306 and/or mounting the connecting assembly 500 to the post mounting portion 172. c) Post tilt—the vertical center line CLP of the post intersects the torque tube beam longitudinal axis LA but is not orthogonal to the longitudinal axis. Such a post tilt condition would again cause difficulty in positioning the torque tube beam 150 in the beam slot 306 and/or mounting the connecting assembly 500 to the post mounting portion 172.

Advantageously, the connecting assembly 500, along with the lower coupling portion 402 of the saddle assembly 400, provide the necessary degrees of freedom or degrees of adjustability to account for post twist, Y direction misalignment, and post tilt conditions.

As noted previously and as best seen in FIGS. 4-5, 8-9 and 11, the W brace 510 includes the pair of vertically oriented outer or side walls 520 and the pair of vertically oriented inner walls 522. The outer and inner walls 520, 522 are spaced apart or separated, as measured axially (that is, as measured along the axis of rotation R or the direction X), by a central upper wall 524 and a pair of flanking lower walls 526. This arrangement results in a three channel configuration for the W brace 510. The channels of the W brace 510 include: a) the inverted U-shaped channel 512 that spaces the flanges 453, 473 of the lower support regions 452, 472 of the first and second saddle members 450, 470; b) an upright channel 514 which receives the lower cylindrical sleeves 455b of lower support region 452 of first saddle member 450; and c) an upright channel 516 which receives lower cylindrical sleeves 475b of lower support region 472 of second saddle member 470. The pair of horizontal fasteners 492 extend in the direction X through aligned apertures formed in the outer and inner side walls 520, 522 of the W brace 510 and the apertures extending through the respective the lower cylindrical sleeves 455b of lower support region 452 of first saddle member 450 and the lower cylindrical sleeves 475b of lower support region 472 of second saddle member 470 to secure the saddle assembly 400 to the W brace 510 of the connecting assembly 400. Advantageously, the apertures through the lower cylindrical sleeves 455b, 475b of the first and second saddle members 450, 470 constitute arched or arcuate slots 459, 479. The arcuate slots 459 provide for tilt adjustability of the solar tracker bearing apparatus 200 with respect to the center line PCVA though the support post 170 and, thus provides for adjustability to account for a post tilt condition. In one exemplary embodiment, the arcuate extent of the arcuate slots 459, 479 is sufficient to allow for +/−2° of tilt adjustability with respect to the post 150 in the direction X.

As best seen in FIGS. 5, 8-9 and 12, the post cap 540 includes a central horizontal planar section or horizontal upper wall 542 that is rectangular in shape and pair of vertically downwardly extending side walls 550, 552 extending from opposite sides 544a, 544b of the horizontal upper wall 542 of the post cap 540. The vertical side walls 550, 552 are parallel and extend in the direction X, that is, parallel to the rotatable bearing assembly axis of rotation R and parallel to the torque tube beam longitudinal axis LA. The remaining opposite two sides 544c, 544d of the horizontal upper wall 542 of the post cap 540 are open, that is, there are no side walls extending from sides 544c, 544d, The horizontal upper wall 542 and side walls 550, 552 of the post cap 540 define and inverted U-shaped opening 554. Each of the downwardly extending side walls 550 includes an array of four spaced apart apertures 556. Eight horizontally extending fasteners 559 extend in the direction Y (orthogonal to the axis of rotation R) through each of the four apertures 556 and through the aligned vertically extending slots 176 in the side walls 174 of the upper mounting portion 172 of the support post 150 to secure the connecting assembly 500 to the support post 150 and thereby mount the solar tracker bearing apparatus 200 to the support post 150. Advantageously, the fact that the mounting slots 176 of the support post 150 extend vertically allows for a range of height adjustment of the solar tracker bearing apparatus 200 with respect to an upper end 178 of the support post 170. That is, the height adjustment of the post cap 540 allows a vertical position of the rotatable bearing assembly 300 to be adjusted in the vertical direction V with respect to the upper end 178 of the support post 150 such that the torque tube beam 150 fits snugly in the beam slot 306.

As best seen in FIGS. 5, 7-9 and 13, the stiffener member 560 is attached to the post cap 540 and is interposed between the post cap 540 and the upper end 170 of the support post 150 and functions to increase structural rigidity of the connecting assembly 500. The stiffener member 560 includes a central horizontal planar section or horizontal upper wall 562 that is rectangular in shape and pair of vertically downwardly extending side walls 570, 575 extending from opposite sides 564c, 564d of the horizontal upper wall 562 of the stiffener member 560. The side walls 570, 572 of the stiffener member 560 are parallel and extend in the horizontal direction Y, that is, perpendicular to the rotatable bearing assembly axis of rotation R and perpendicular to the torque tube beam longitudinal axis LA. The remaining opposite two sides 564a, 564b of the horizontal upper wall 562 of the stiffener member 560 are open, that is, there are no side walls extending from sides 564a, 564b. The horizontal upper wall 562 and side walls 570, 572 of the stiffener member 560 define and inverted U-shaped opening 574.

Advantageously, the horizontal upper wall 562 and side walls 570, 572 of the stiffener member 560 is sized to be received within the inverted U-shaped opening 554 of the post cap 540. That is, the horizontal upper wall 542 of the post cap overlies and is in planar contact with the horizontal upper wall 562 of the stiffener member 560. Further, the side walls 570, 572 of the stiffener member 570 are orthogonal to the side walls 550, 552 of the post cap 540 such that vertical edges 573 of the respective side walls 570, 572 of the stiffener member 560 are orthogonal to and abut the respective side walls 550, 552 of the post cap 540. The side walls 550, 552, 570, 572 of the post cap 540 and stiffener member 560 form a box-like configuration of four orthogonal, vertically extending side walls 550, 552, 570, 572 which advantageously functions to increase the structural rigidity of the connecting assembly 500.

As explained above, the lower coupling portion 402 of the saddle assembly 400 is affixed to the W brace 510 and the post cap 540 is affixed to the upper mounting portion 172 of the support post 150. The U-shaped opening 574 of the stiffener member 560 is received on the upper end 178 of the support post 150. The stiffening member 560 is held rigidly and firmly in place on the upper end 178 of the support post 150 by the horizontal upper wall 542 of the post cap 540 which bears against the horizontal upper wall 562 of the stiffener member 560 and sandwiches the stiffener member 560 against the upper end 178 of the support post 150 when the post cap 540 is affixed to the side walls 174 of the support post 170 via a pair of fasteners. Thus, both the post cap 540 and the stiffening member 574 are rigidly and firmly affixed to the support post 150.

The horizontal upper walls 542, 562 of the post cap 540 and stiffener member 560 each include an aligned array of four concentric arcuate openings or slots. The horizontal upper wall 542 of the post cap 540 includes an array four arcuate slots 558. The four arcuate slots 558 are generally centered about a vertical center line UWVCL though the horizontal upper walls 542, 562 of the post cap 540 and stiffener member 560. The horizontal upper wall 542 of the stiffener member 560 includes an aligned array of four arcuate slots 578. The four arcuate slots 578 are generally centered about or concentric with the vertical center line UWVCL. The four arcuate slots 558 of the horizontal upper wall 542 of the post cap 540 and the four arcuate slots 558 of the horizontal upper wall 562 of the stiffener member 560 are vertically aligned and are concave with respect to the vertical center line UWVCL. In one exemplary embodiment, the four arcuate slots 558 are concentric with a center point on the vertical center line UWVCL. Additionally, the pair of spaced apart lower walls 526 of the W brace 510 each include a pair of straight slots 528 forming an array of four straight slots which are generally centered about a vertical center line BVCL through the W brace 510. The combination of the array of four arcuate slots 558, 578 of the horizontal upper walls 542, 562 of the post cap 540 and stiffener member 560, combined with the array of four straight slots 528 of the lower walls 526 of the W brace 510 advantageously allow for: a) limited rotational adjustability of the W brace 510 and, thus, the saddle assembly 400 and rotational bearing assembly 300, which are affixed to the W brace 510, with respect to the post cap 540 to account for the post twist condition; and b) limited linear adjustability of the W brace 510 and, thus, the saddle assembly 400 and rotational bearing assembly 300, which are affixed to the W brace 510, in the Y direction (orthogonal to the axis of rotation R) to account for Y direction misalignment condition.

Four vertically extending fasteners 580 extend through the aligned four straight slots 528 of the lower walls 526 of the W brace 510, the four arcuate slots 558 of the horizontal upper wall 542 of the post cap 540 and the four arcuate slots 578 of the horizontal upper wall 562 of the stiffener member 560 to secure the assembled combination 600 of the W brace 510, the saddle assembly 400 and rotational bearing assembly 300 to the post cap 540 and stiffener member 560 and thereby secure the assembled combination 600 to the support post 170. Advantageously, because the overlap of the four straight slots 528 of the lower walls 526 of the W brace 510, the four arcuate slots 558 of the horizontal upper wall 542 of the post cap 540 and the four arcuate slots 578 of the horizontal upper wall 562 of the stiffener member 560, the assembled combination 600 of the W brace 510, the saddle assembly 400 and rotational bearing assembly 300 to the post cap 540 may be rotated about the vertical center line BVCL through the W brace 510. This rotational adjustability of the W brace 510, the saddle assembly 400 and rotational bearing assembly 300 account for the post twist condition. In one exemplary embodiment, the angular range of rotation of the assembled combination 600 of the W brace 510, the saddle assembly 400 and the rotational bearing assembly 300 about the vertical center line BVCL is approximately +/−8 degrees.

Additionally, because of the aligned four straight slots 528 of the lower walls 526 of the W brace 510, advantageously, the assembled combination 600 of the W brace 510, the saddle assembly 400 and the rotational bearing assembly 300 have limited travel or adjustability permitted in the direction Y (orthogonal to the axis of rotation R). This linear adjustability of the assembled combination 600 of the W brace 510, saddle assembly 400 and rotational bearing assembly 300 in the direction Y accounts for the Y direction misalignment condition. In one exemplary embodiment, the linear adjustability along the direction Y resulting from the four straight slots 528 of the lower walls 526 of the W brace 510 is +/−0.75 in.

In one exemplary embodiment, the first and second bearing members 350, 370 of the rotatable bearing assembly 300 and the first and second saddle members 450, 470 of the saddle assembly 400 are fabricated of cast aluminum. The first and second bearing members 350, 370 and first and second saddle members 450, 470 could also be made of other materials having similar characteristics or properties including but not limited to cast steel, machined aluminum, machined steel and molded polymer. In one exemplary embodiment, the components of the connecting assembly 500 are made of steel, but could also be made of aluminum or a polymer or filled or reinforced polymer.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A solar tracker bearing apparatus mountable to a support post for pivotally supporting a torque tube beam of a solar tracker assembly, the solar tracker bearing apparatus comprising:

a rotatable bearing assembly supported for rotation about an axis of rotation by a saddle assembly, the rotatable bearing assembly including a first bearing member and a second bearing member, the first bearing member including a central portion and a first arcuate peripheral portion and the second bearing member including a central portion and a second arcuate peripheral portion, the central portion of the first bearing member and the central portion of the second bearing member defining a torque tube beam slot, the first arcuate peripheral portion of the first bearing member including a first arcuate rim bearing and the second arcuate peripheral portion of the second bearing member including a second arcuate rim bearing, the first and second rim bearings being spaced apart in a direction parallel to the axis of rotation of the rotatable bearing assembly, the first bearing member including a first projection extending in a direction toward the second bearing member and the second bearing member including a second projection extending in a direction toward the first bearing member, the first and second projections of the first and second bearing members spacing the first and second bearing members apart and forming part of the torque tube beam slot of the rotatable bearing assembly; and the saddle assembly including a lower coupling portion and an upper bearing portion, the upper bearing portion including a first arcuate bearing race and a spaced apart second arcuate bearing race, the first and second arcuate bearing races being spaced apart in a direction parallel to the axis of rotation of the rotatable bearing assembly, the first arcuate bearing race slidably supporting the first arcuate rim bearing of the rotatable bearing assembly and the second arcuate bearing race slidably supporting the second arcuate rim bearing of the rotatable bearing assembly.

2. The solar tracker bearing apparatus of claim 1 further including a connecting assembly affixed to the lower coupling portion of the saddle assembly including a bracket secured to the coupling portion of the saddle assembly, a post cap having a central planar section and a pair of vertically extending sides and a stiffener member having a central planar section having a pair of vertically extending sides, the central planar section of the post cap overlying the central planar section of the stiffener member such that the pair of vertically extending sides of the post cap are orthogonal to the pair of vertically extending sides of the stiffener.

3. The solar tracker bearing apparatus of claim 2 wherein the central planar section of the post cap includes an array of four arcuate slots and the central planar section of the stiffener member includes an array of four arcuate slots, the array of four arcuate slots of the central planar section of the post cap being aligned with the array of four arcuate slots of the stiffener member.

4. The solar tracker bearing apparatus of claim 3 wherein the bracket includes a central upper wall and first and second vertical side walls extending from the central upper wall forming central inverted U-shaped channel and first and second lower walls extending from respective ones of the first and second vertical side walls, the first and second lower walls including an array of four slots aligned with the array of four arcuate slots of the central planar section of the post cap and the array of four arcuate slots of the stiffener member.

5. The solar tracker bearing assembly of claim 4 wherein the lower coupling portion of the saddle assembly includes a pair of arcuate slots extending through the lower coupling portion and the bracket includes aligned apertures through the first and second vertical side walls, a pair of fasteners extend though the respective arcuate slots of the lower coupling portion and an aligned pair of apertures through the first and second vertical side walls of the bracket such that the saddle assembly has tilt adjustability with respect to the bracket.

6. The solar tracker bearing apparatus of claim 1 wherein the first projection of the first bearing member and the second projection of the second bearing member extend parallel to the axis of rotation of the rotatable bearing assembly, facing surfaces of the projections of the first bearing member and the second bearing member abutting to space apart the central regions of the first and second bearing members.

7. The solar tracker bearing apparatus of claim 6 wherein the central region of the first bearing member includes a cut out adjacent the first projection and the central region of the second bearing member includes a cut out adjacent the second projection, the cut out of the first bearing member and the cut out of the second bearing member and the projection of the first bearing member and the projection of the second bearing member being part of the torque tube beam slot of the rotatable bearing assembly.

8. The solar tracker bearing apparatus of claim 6 wherein the first arcuate bearing race of the upper bearing portion of the saddle assembly includes an inner bearing race and a radially spaced apart outer bearing race, the inner bearing race providing sliding bearing support for an inner surface of the first rim bearing and the outer bearing race providing sliding bearing support for an outer surface of the first rim bearing and the second arcuate bearing race of the upper bearing portion of the saddle assembly includes an inner bearing race and a radially spaced apart outer bearing race, the inner bearing race providing sliding bearing support for an inner surface of the second rim bearing and the outer bearing race providing sliding bearing support for an outer surface of the second rim bearing.

9. The solar tracker bearing assembly of claim 8 wherein the saddle assembly including a first saddle member and a second saddle member affixed to the first saddle member, the first saddle member including an upper bearing region including the first arcuate bearing race and a lower support region, the lower support region including a projection extending in a direction parallel to the axis of rotation of the rotatable bearing assembly toward the second saddle member and the second saddle member including an upper bearing region including the second arcuate bearing race and a lower support region, the lower support region including a projection extending in a direction parallel to the axis of rotation of the rotatable bearing assembly toward the first saddle member, facing surfaces of the projections of the first saddle member and the second saddle member abutting to space apart the first and second arcuate bearing races.

10. The solar tracker bearing assembly of claim 9 wherein the projection of the first saddle member includes a first projection extending from a flange of the lower support region and a spaced apart second projection extending from the flange of the lower support region and the second saddle member includes a first projection extending from a flange of the lower support region and a spaced apart second projection extending from the flange of the lower support region, the flange of the lower support region of the first saddle member includes a first boss and a second boss, the first boss includes a first arcuate slot extending through the boss in a direction parallel to the axis of rotation of the rotatable bearing assembly and the second boss including a second arcuate slot extending through the boss in a direction parallel to the axis of rotation of the rotatable bearing assembly and the flange of the lower support region of the second saddle member includes a first boss and a second boss, the first boss includes a first arcuate slot extending through the boss in a direction parallel to the axis of rotation of the rotatable bearing assembly and the second boss including a second arcuate slot extending through the boss in a direction parallel to the axis of rotation of the rotatable bearing assembly, the first arcuate slot of the first boss of the first saddle member being aligned with the first arcuate slot of the first boss of the second saddle member and the second arcuate slot of the second boss of the first saddle member being aligned with the second arcuate slot of the first boss of the second saddle member and a pair of fasteners extending though the respective first and second arcuate slots of the first and second saddle members and an aligned pair of apertures through vertical side walls of the bracket such that the saddle assembly has tilt adjustability with respect to the bracket.

11. The solar tracker bearing apparatus of claim 9 wherein the first arcuate bearing race of the upper bearing region of the first saddle member of the saddle assembly is defined by a first arcuate insert disposed in a first arcuate slot of the upper bearing region of the first saddle member and the second arcuate bearing race of the upper bearing region of the second saddle member of the saddle assembly is defined by a second arcuate insert disposed in a second arcuate slot of the upper bearing region of the first saddle member.

12. The solar tracker bearing apparatus of claim 1 wherein the first arcuate bearing race of the upper bearing portion of the saddle assembly is defined by a first arcuate insert disposed in a first arcuate slot of the upper bearing portion of the saddle assembly and the second arcuate bearing race of the upper bearing portion of the saddle assembly is defined by a second arcuate insert disposed in a second arcuate slot of the upper bearing portion of the saddle assembly.

13. The solar tracker bearing apparatus of claim 1 wherein a shim is positioned in the torque tube beam slot adjacent a bottom wall of the torque tube beam slot to adjust a vertical position of a torque tube beam in the torque tube beam slot.

14. The solar tracker bearing apparatus of claim 1 wherein the beam slot is defined by walls defining a perimeter of the beam slot and includes a central axis extending through the beam slot in direction parallel to the axis of rotation of the rotatable bearing assembly and the axis of rotation of the rotatable bearing assembly is spaced from the central axis of the beam slot.

15. The solar tracker bearing apparatus of claim 1 wherein the axis of rotation of the rotatable bearing assembly is outside of the beam slot.

16. A solar tracker bearing apparatus mountable to an upright support post for pivotally supporting a torque tube beam of a solar tracker assembly, the solar tracker bearing apparatus comprising:
a rotatable bearing assembly supported for rotation about an axis of rotation by a saddle assembly, the rotatable bearing assembly including a torque tube beam slot and a first bearing member and a second bearing member affixed to the first bearing member, the first bearing member including a central region and a laterally extending peripheral rim and the second bearing member including a central region and a laterally extending peripheral rim, the laterally extending peripheral rim of the first bearing member including a first arcuate rim bearing and the laterally extending peripheral rim of the second bearing member including a second arcuate rim bearing, the first and second rim bearings being spaced apart in a direction parallel to the axis of rotation of the rotatable bearing assembly, the central region of the first bearing member including a cut out in an upper portion of the central region and a projection adjacent the cut out and extending in a direction parallel to the axis of rotation of the rotatable bearing assembly toward the second bearing member, the central region of the second bearing member including a cut out in an upper portion of the central region and a projection adjacent the cut out and extending in a direction parallel to the axis of rotation of the rotatable bearing assembly toward the first bearing member, facing surfaces of the projections of the first bearing member and the second bearing member abutting to space apart the central regions of the first and second bearing members and the cut out of the first bearing member and the cut out of the second bearing member and the projection of the first bearing member and the projection of the second bearing member being part of the torque tube beam slot of the rotatable bearing assembly; and
the saddle assembly including a lower coupling portion and an upper bearing portion, the upper bearing portion including a first arcuate bearing race and a spaced apart second arcuate bearing race, the first and second arcuate bearing races being spaced apart in a direction parallel to the axis of rotation of the rotatable bearing assembly, the first arcuate bearing race slidably supporting the first arcuate rim bearing of the first bearing member of the rotatable bearing assembly and the second arcuate bearing race slidably supporting the second arcuate rim bearing of the second bearing member of the rotatable bearing assembly.

17. The solar tracker bearing apparatus of claim 16 further including a connecting assembly affixed to the lower coupling portion of the saddle assembly including a bracket secured to the coupling portion of the saddle assembly, a post cap having a central planar section and a pair of vertically extending sides and a stiffener member having a central planar section having a pair of vertically extending sides, the central planar section of the post cap overlying the central planar section of the stiffener member such that the pair of vertically extending sides of the post cap are orthogonal to the pair of vertically extending sides of the stiffener.

18. The solar tracker bearing apparatus of claim 17 wherein the central planar section of the post cap includes an array of four arcuate slots and the central planar section of the stiffener member includes an array of four arcuate slots, the array of four arcuate slots of the central planar section of the post cap being aligned with the array of four arcuate slots of the stiffener member.

19. The solar tracker bearing apparatus of claim 18 wherein the bracket includes a central upper wall and first and second vertical side walls extending from the central upper wall forming central inverted U-shaped channel and first and second lower walls extending from respective ones of the first and second vertical side walls, the first and second lower walls including an array of four slots aligned with the array of four arcuate slots of the central planar section of the post cap and the array of four arcuate slots of the stiffener member.

20. The solar tracker bearing assembly of claim 19 wherein the lower coupling portion of the saddle assembly includes a pair of arcuate slots extending through the lower coupling portion and the bracket includes aligned apertures through the first and second vertical side walls, a pair of fasteners extend though the respective arcuate slots of the lower coupling portion and an aligned pair of apertures through the first and second vertical side walls of the bracket such that the saddle assembly has tilt adjustability with respect to the bracket.

21. The solar tracker bearing apparatus of claim 16 wherein the saddle assembly including a first saddle member and a second saddle member affixed to the first saddle member, the first saddle member including an upper bearing region including the first arcuate bearing race and a lower support region, the lower support region including a projection extending in a direction parallel to the axis of rotation of the rotatable bearing assembly toward the second saddle member and the second saddle member including an upper bearing region including the second arcuate bearing race and a lower support region, the lower support region including a projection extending in a direction parallel to the axis of rotation of the rotatable bearing assembly toward the first saddle member, facing surfaces of the projections of the first saddle member and the second saddle member abutting to space apart the first and second arcuate bearing races.

22. The solar tracker bearing apparatus of claim 16 wherein a shim is positioned in the torque tube beam slot adjacent a bottom wall of the torque tube beam slot to adjust a vertical position of a torque tube beam in the torque tube beam slot.

23. The solar tracker bearing apparatus of claim 16 wherein the torque tube beam slot is defined by a wall defining a perimeter of the beam slot and includes a central axis extending through the beam slot in direction parallel to the axis of rotation of the rotatable bearing assembly and the axis of rotation of the rotatable bearing assembly is spaced from the central axis of the torque tube beam slot.

24. The solar tracker bearing apparatus of claim 16 wherein the axis of rotation of the rotatable bearing assembly is outside of the torque tube beam slot.

25. A solar tracker bearing apparatus mountable to a support post for pivotally supporting a torque tube beam of a solar tracker assembly, the solar tracker bearing apparatus comprising:
a rotatable bearing assembly supported for rotation about an axis of rotation by a saddle assembly, the rotatable bearing assembly including a first bearing member and a second bearing member, the first bearing member including a central portion and a first arcuate peripheral portion and the second bearing member including a central portion and a second arcuate peripheral portion, the central portion of the first bearing member and the central portion of the second bearing member defining a torque tube beam slot, the first arcuate peripheral portion of the first bearing member including a first arcuate rim bearing and the second arcuate peripheral portion of the second bearing member including a second arcuate rim bearing, the first and second rim bearings being spaced apart in a direction parallel to the axis of rotation of the rotatable bearing assembly, at least one of the first bearing member and the second bearing member including a first projection extending in a direction toward the other of the first bearing member and the second bearing member, the first projection spacing the first and second bearing members apart in a direction parallel to the axis of rotation and forming part of the torque tube being slot of the rotatable bearing assembly; and
the saddle assembly including a lower coupling portion and an upper bearing portion, the upper bearing portion including a first arcuate bearing race and a spaced apart second arcuate bearing race, the first arcuate bearing race slidably supporting the first arcuate rim bearing of the rotatable bearing assembly and the second arcuate bearing race slidably supporting the second arcuate rim bearing of the rotatable bearing assembly.

26. The solar tracker bearing apparatus of claim 25 further including a connecting assembly affixed to the lower coupling portion of the saddle assembly including a bracket secured to the lower coupling portion of the saddle assembly, a post cap having a central planar section and a pair of vertically extending sides and a stiffener member having a central planar section having a pair of vertically extending sides, the central planar section of the post cap overlying the central planar section of the stiffener member such that the pair of vertically extending sides of the post cap are orthogonal to the pair of vertically extending sides of the stiffener.

27. The solar tracker bearing assembly of claim 25 wherein the first bearing member includes the first projection and the second bearing member includes a second projection, wherein the first projection of the first bearing member and the second projection of the second bearing member extend parallel to the axis of rotation of the rotatable bearing assembly, facing surfaces of the first projection of the first bearing member and the second projection of the second bearing member abutting to space apart the central regions of the first and second bearing members.

28. The solar tracker bearing apparatus of claim 25 wherein a shim is positioned in the torque tube beam slot adjacent a bottom wall of the torque tube beam slot to adjust a vertical position of a torque tube beam in the torque tube beam slot.

29. The solar tracker bearing apparatus of claim 25 wherein the axis of rotation of the rotatable bearing assembly is outside of the torque tube beam slot.

30. The solar tracker bearing apparatus of claim 25 wherein the torque tube beam slot is defined by a wall defining a perimeter of the beam slot and includes a central axis extending through the beam slot in direction parallel to the axis of rotation of the rotatable bearing assembly and the axis of rotation of the rotatable bearing assembly is spaced from the central axis of the torque tube beam slot.

* * * * *